US010867238B2

(12) United States Patent
Davies

(10) Patent No.: US 10,867,238 B2
(45) Date of Patent: Dec. 15, 2020

(54) POPULATION-BASED CONNECTIVITY ARCHITECTURE FOR SPIKING NEURAL NETWORKS

(71) Applicant: Intel Corporation, Santa Clara, CA (US)

(72) Inventor: Michael I. Davies, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1028 days.

(21) Appl. No.: 15/385,057

(22) Filed: Dec. 20, 2016

(65) Prior Publication Data

US 2018/0174033 A1    Jun. 21, 2018

(51) Int. Cl.
G06N 3/063 (2006.01)
G06N 3/04 (2006.01)
G06N 3/08 (2006.01)

(52) U.S. Cl.
CPC .......... *G06N 3/0635* (2013.01); *G06N 3/049* (2013.01); *G06N 3/063* (2013.01); *G06N 3/08* (2013.01)

(58) Field of Classification Search
CPC ...... G06N 3/0635; G06N 3/049; G06N 3/063; G06N 3/08
See application file for complete search history.

(56) References Cited

U.S. PATENT DOCUMENTS

| 6,185,673 B1 * | 2/2001 | Dewan | G06F 9/30101 |
| | | | 712/223 |
| 8,914,315 B2 | 12/2014 | Modha et al. | |
| 2013/0073498 A1 * | 3/2013 | Izhikevich | G06N 3/105 |
| | | | 706/27 |
| 2014/0032465 A1 * | 1/2014 | Modha | G06N 3/04 |
| | | | 706/27 |

(Continued)

OTHER PUBLICATIONS

Merolla et al., "A Digital Neurosynaptic Core Using Embedded Crossbar Memory with 45 pJ per Spike in 45nm," in 2011 IEEE Custom Integrated Circuits Conf. 1-4 (2011). (Year: 2011).*

(Continued)

*Primary Examiner* — Kamran Afshar
*Assistant Examiner* — Ryan C Vaughn
(74) *Attorney, Agent, or Firm* — Schwegman Lundberg & Woessner, P.A.

(57) ABSTRACT

An electronic neuromorphic core processor circuit and related method include a dendrite circuit comprising an input that receives an input spike message having an associated input identifier that identifies a distribution set of dendrite compartments. A synapse map provides a mapping of the received identifier to a synapse configuration in the memory. A synapse configuration circuit associates the identifier with a set of synaptic connections, possibly shared hierarchically over populations of neurons defined implicitly by the mapping structures, that are read from the memory. The synaptic connections determine n-tuple information comprising a dendrite ID, a weight, and a network delay (Continued)

time. A dendrite accumulator circuit accumulates weight values scheduled at the appropriate future time as identified by the n-tuple information and maps them to a soma compartment. A soma circuit maintains a soma compartment state in response to the accumulated weight values scheduled for servicing and, when sufficiently activated, produces output spikes.

21 Claims, 19 Drawing Sheets

(56) References Cited

U.S. PATENT DOCUMENTS

| | | | | |
|---|---|---|---|---|
| 2015/0269482 | A1* | 9/2015 | Annapureddy | G06N 3/049 706/25 |
| 2015/0294217 | A1* | 10/2015 | Aparicio, IV | G06N 3/049 706/26 |
| 2016/0358075 | A1* | 12/2016 | Zhang | G06N 3/088 |
| 2017/0286825 | A1* | 10/2017 | Akopyan | G06N 3/049 |
| 2017/0316306 | A1* | 11/2017 | Katayama | G06N 3/063 |
| 2018/0139153 | A1* | 5/2018 | Moradi | G06N 3/049 |

OTHER PUBLICATIONS

Qiao et al., "A Reconfigurable On-line Learning Spiking Neuromorphic Processor Comprising 256 Neurons and 128K Synapses," in 9 Frontiers in Neuroscience 141 (2015). (Year: 2015).*

Wang et al., "Architectural Design Exploration for Neuromorphic Processors with Memristive Synapses," in Proc. 14th IEEE Intl. Conf. Nanotech. 962-66 (2014). (Year: 2014).*

Moore et al., "Bluehive—A Field-Programmable Custom Computing Machine for Extreme Real-Time Neural Network Simulation," in 2012 IEEE 20th Intl. Symp. Field-Programmable Custom Computing Machines 133-40 (2012). (Year: 2012).*

Davies et al., "Population-Based Routing in the SpiNNaker Neuromorphic Architecture," in 2012 IEEE Joint Conf. Neural Networks 1-8 (2012). (Year: 2012).*

Davies et al., "Maintaining Real-Time Synchrony on SpiNNaker," in Proc. 8th ACM Intl. Conf. Computing Frontiers 1-2 (2011). (Year: 2011).*

"European Application Serial No. 17204537.9, Extended European Search Report dated Jun. 4, 2018", 16 pgs.

Filipp, Akopyan, "TrueNorth: Design and Tool Flow of a 65 mW 1 Million Neuron Programmable Neurosynaptic Chip", IEEE Transactions on Computer Aided Design of Integrated Circuits and Systems, IEEE Service Center, Piscataway, NJ, US, vol. 34, No. 10, (Sep. 17, 2015), 44 pgs.

Imam, Nabil, "Neural spiking dynamics in asynchronous digital circuits", The 2013 International Joint Conference on Neuralnetworks (IJCNN), IEEE, (Aug. 4, 2013), 1-8.

Steve, Furber, "The SpiNNaker Project", Proceedings of the IEEE, IEEE. New York, US, vol. 102, No. 5, (Apr. 28, 2014), 652-665.

Steve, Furber, "Large-scale neuromorphic computing systems", Journal of Neural Engineering, Institute of Physicspublishing, Bristol, GB, val. 13, No. 5, (Aug. 16, 2016), 14 pgs.

* cited by examiner

| 31 30 | 29 28 27 26 25 24 23 22 21 20 | 19 18 17 16 15 14 13 12 11 10 9 8 | 7 6 5 4 3 | 2 | 1 0 |
|---|---|---|---|---|---|
| NGROUP_BASE | NGROUP_BASE | CFG_LEN | CFG_BASE | | |
| ATOM BITS | | CFG_LEN | CFG_BASE | | DISCRETE SPIKE |
| | | | | | POPULATION SPIKE |

| | 63 62 61 60 59 58 57 56 55 54 53 52 51 50 49 48 | 47 46 45 44 43 42 41 40 39 38 37 36 35 34 33 32 | 31 30 29 28 27 26 25 24 23 22 21 20 19 18 17 16 | 15 14 13 12 11 10 9 8 | 7 6 5 4 3 | 2 0 | |
|---|---|---|---|---|---|---|---|
| S0 | $D_3$ $W_7$ | $DEN_3$ $D_2$ $W_5$ | $D_1$ $W_3$ | $D_0$ $W_1$ | $DEN_0$ $W_0$ | | SPARSE (4) |
| S1 | $D_7$ $W_{14}$ | $D_6$ $W_{12}$ $D_5$ $W_{10}$ | $D_4$ $W_8$ $D_3$ $W_6$ | $D_2$ $W_4$ $D_1$ $W_2$ | $DEN_1$ $D_0$ $W_0$ | DLY | DENSE (8) |
| S2 | $W_{15} W_{14} W_{13}$ | $W_{12} W_{11} W_{10} W_9$ | $W_8 W_7 W_6 W_5$ | $W_4 W_3 W_2 W_1$ | $DEN$ $W_0$ | DLY | DENSE (16) |
| S3 | $DEN_3$ $D_3$ $W_7$ | $D_2$ $W_5$ | $DEN_2$ $D_1$ $W_3$ | $D_0$ $W_1$ | $DEN$ $W_0$ | WGT | DENSE (48) |
| S4 | $D_7$ $W_7$ | $D_6$ $W_5$ $D_5$ $W_5$ | $D_4$ $W_4$ $D_3$ $W_3$ | $D_2$ $W_2$ $D_1$ $W_1$ | $DEN$ $D_0$ $W_0$ | DLY | BOX* (4) |
| S5 | $W_{11} W_{10}$ | $W_9$ $W_8$ | $W_7$ $W_6$ | $W_5 W_4 W_3 W_2$ | W_Hi[7:0] | B T | POP (8) |
| - | $W_7$ | $W_6$ | $W_5$ $W_4$ | $W_3 W_2 W_1$ | Hi[7:0] | | POP (8)** |
| S5 | $W_{12}$ | $W_{10} W_9 W_8$ | $W_7 W_6$ | $W_5 W_4 W_3 W_2$ | $W_1$ $W_0$ | | POP (12) |
| S7 | $W_{14} W_{13}$ | $W_{11} W_{10} W_9 W_8$ | $W_7 W_6 W_5 W_4$ | $W_3 W_2 W_1$ | $W_0$ | | POP (15) |

| PARAMETER | BITS | DESCRIPTION |
| --- | --- | --- |
| ENABLENOISE | 9 | CONTROLS WHETHER PSEUDORANDOM NOISE IS ADDED TO THE ACCUMULATED SPIKE INPUT FROM DENDRITE_ACCUM |
| STACKIN | 8:7 | CONTROLS MULTI-COMPARTMENT STACK INPUT HANDLING FOR THIS COMPARTMENT. 3: POP ALL VALUES FROM THE COMPARTMENT STACK |
| STACKOUT | 6:5 | CONTROLS MULTI-COMPARTMENT STACK OUTPUT HANDLING FOR THIS COMPARTMENT. |
| JOINOP | 4:2 | SPECIFIES THE COMPARTMENT STACK JOIN OPERATION, I.E. HOW INPUT FROM THE COMPARTMENT STACK IS COMBINED WITH THIS COMPARTMENT'S V/U STATE TO PRODUCE ITS OUTPUT Y AND THRESHOLD EVALUATION DECISION S. |
| THRESHOP | 1:0 | DETERMINES BEHAVIOR OF THE COMPARTMENT WHEN THE THRESHOLD EVALUATION RETURNS TRUE (V>THRESHOLD): |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| - | 0 | | | | | | | SRCATOM | | | | | | | | | AXONCFGLEN | | | | | | | | AXONCFGBASE | | | | | | DISCRETE SPIKE |
| - | | | | | | | | | | | | | | | | | AXONCFGLEN | | | | | | | | AXONCFGBASE | | | | | | POPULATION SPIKE |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| M | 0 | 0 | | | | | | AXONID | | | | | | | | | | | | | | MESHDST | | | | | | | | | DISCRETE SPIKE |
| M | 0 | 1 | | | | | | BARRIER SYNC EVENT # | | | | | | | | | | | | | | MESHDST | | | | | | | | | BARRIER EVENT |
| M | 0 | 0 | | FIP_HI | | | | | | FIP_LO/0 | | | | | | | 0 | | | | | MESHDST | | | | | | | | | POPULATION SPIKE |
| 0 | 1 | | | | | | | REMOTECHIPID | | | | | | | | | | | | | | MESHDST | | | | | | | | | REMOTE SPIKE |

US 10,867,238 B2

POPULATION-BASED CONNECTIVITY ARCHITECTURE FOR SPIKING NEURAL NETWORKS

TECHNICAL FIELD

The present disclosure relates to devices and methods for operating a neuromorphic processor comprised of neuromorphic cores.

BACKGROUND

A neuromorphic processor is a processor that is structured to mimic certain aspects of the brain and its underlying architecture, particularly its neurons and the interconnections between the neurons, although such a processor may deviate from its biological counterpart. A neuromorphic processor may be comprised of many neuromorphic (neural network) cores that are interconnected via a bus and routers which may direct communications between the cores. This network of cores may communicate via short packetized spike messages sent from core to core. Each core may implement some number of primitive nonlinear temporal computing elements (neurons). When a neuron's activation exceeds some threshold level, it may generate a spike message that is propagated to a fixed set of fan-out neurons contained in destination cores. The network then may distribute the spike messages to all destination neurons, and in response, those neurons update their activations in a transient, time dependent manner.

BRIEF DESCRIPTION OF THE DRAWINGS

FIG. 16 is a memory map of SYNAPSE_MAP, according to an example;

FIG. 17 is a memory map of SYNAPSE_CFG, according to an example;

FIG. 21, which is a memory map illustrating OpCodes, according to an example;

FIG. 22 is a memory map illustrating the SOMA_STATE, according to an example;

FIG. 23 is a memory map illustrating the SOMA_SHARED_CFG parameter, according to an example;

FIG. 24 is a memory map illustrating the AXON_MAP, according to an example;

FIG. 25 is a memory map illustrating AXON_CFG, according to an example;

DETAILED DESCRIPTION

The following is a detailed description of various embodiments and configurations depicted in the accompanying drawings. However, the amount of detail offered is not intended to limit anticipated variations of the described configurations; to the contrary, the claims and detailed description are to cover all modifications, equivalents, and alternatives falling within the spirit and scope of the present teachings as defined by the claims. The detailed descriptions below are designed to make such configurations understandable to a person having ordinary skill in the art.

There are a variety of ways in which a neuromorphic processor may be architected. It is, however, desirable to create an efficient and fast neuromorphic processor that borrows from the biological model where practical, but deviates from the biological model when it is advantageous to do so. The examples and techniques below provide architectures to achieve just such a neuromorphic processor.

As used herein, references to "neural network" for at least some examples is specifically meant to refer to a "spiking neural network"; thus, many references herein to a "neuron"

are meant to refer to an artificial neuron in a spiking neural network. It will be understood, however, that certain of the following examples may also apply to other forms of artificial neural networks.

In an example of a spiking neural network, activation functions occur via spike trains, which means that time is a factor that has to be considered. Further, in a spiking neural network, each neuron is modeled after a biological neuron, as the artificial neuron receives its inputs via synaptic connections to one or more "dendrites" (part of the physical structure of a biological neuron), and the inputs affect an internal membrane potential of the artificial neuron "soma" (cell body). In a spiking neural network, the artificial neuron "fires" (e.g., produces an output spike), when its membrane potential crosses a firing threshold. Thus, the effect of inputs on a spiking neural network neuron operate to increase or decrease its internal membrane potential, making the neuron more or less likely to fire. Further, in a spiking neural network, input connections may be stimulatory or inhibitory. A neuron's membrane potential may also be affected by changes in the neuron's own internal state ("leakage").

Figure 1:
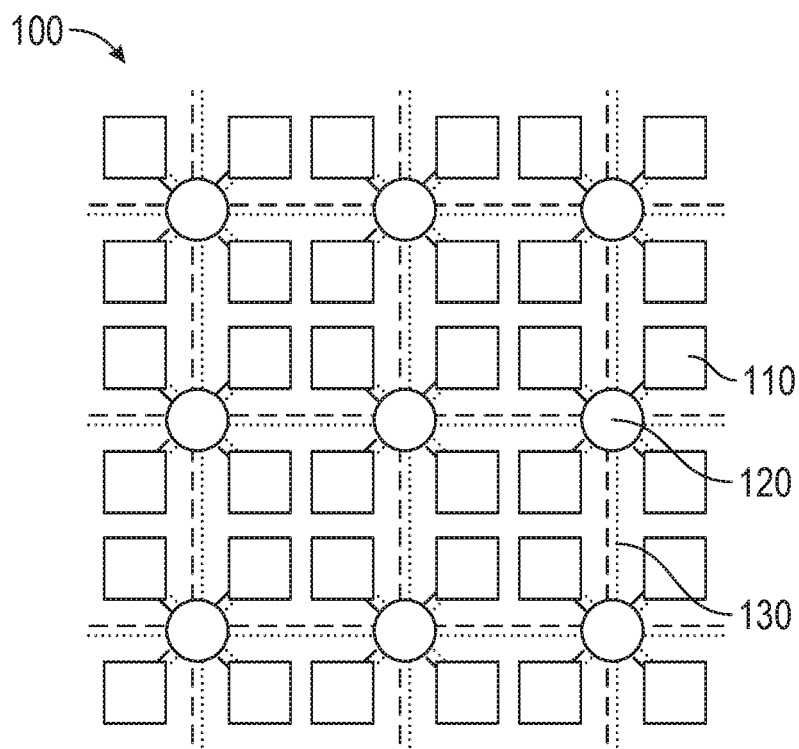
FIG. 1 is a pictorial diagram of an example of a neuromorphic architecture that includes a mesh network, according to an example.

FIG. 1 is a pictorial diagram of an example of a neuromorphic architecture 100 that includes a mesh network in which a plurality of neuromorphic cores 110, routers 120, and a grid of routing conductors 130 are arranged to provide a SNN in which the cores 110 may communicate with other cores 110.

Figure 2:
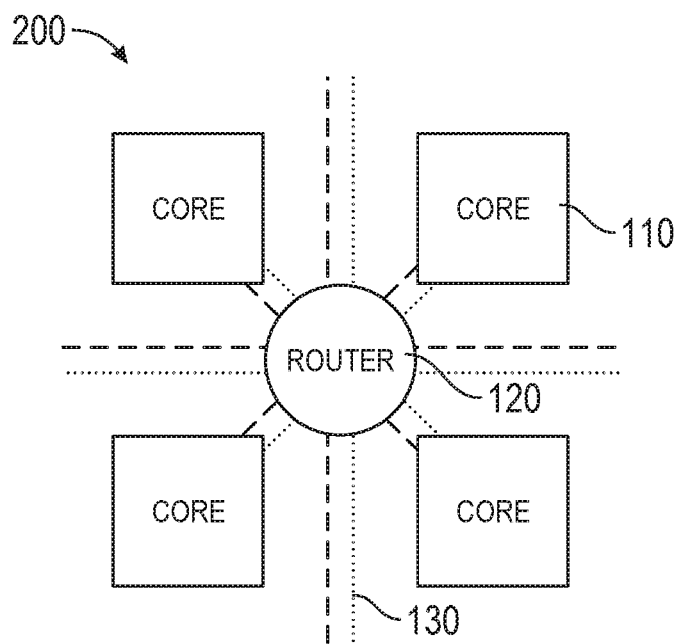
FIG. 2 is a pictorial diagram that shows details of a four-core tile, according to an example.

FIG. 2 is a pictorial diagram that shows details of a four-core tile 200 that is arrayed in two dimensions to form the mesh network. The routers 120 may be coupled to route information through the network routing conductors 130 to provide communication paths between cores in the network.

The cores 110 may communicate via short packetized spike messages that are sent from core 110 to core 110. Each core 110 may implement a plurality of primitive nonlinear temporal computing elements referred to herein as "neurons". In some embodiments, each core includes up to 1024 neurons. Each neuron may be characterized by an activation threshold. A spike message received by a neuron contributes to the activation of the neuron. When a neuron's activation exceeds its activation threshold level, the neuron generates a spike message that is propagated to a fixed set of fan-out destination neurons indicated within the spike message that are contained in destination cores. The network distributes the spike messages to all destination neurons, and in response to the spike message, those destination neurons update their activation levels in a transient, time-dependent manner, analogous to the operation of real biological neurons.

Figure 3:
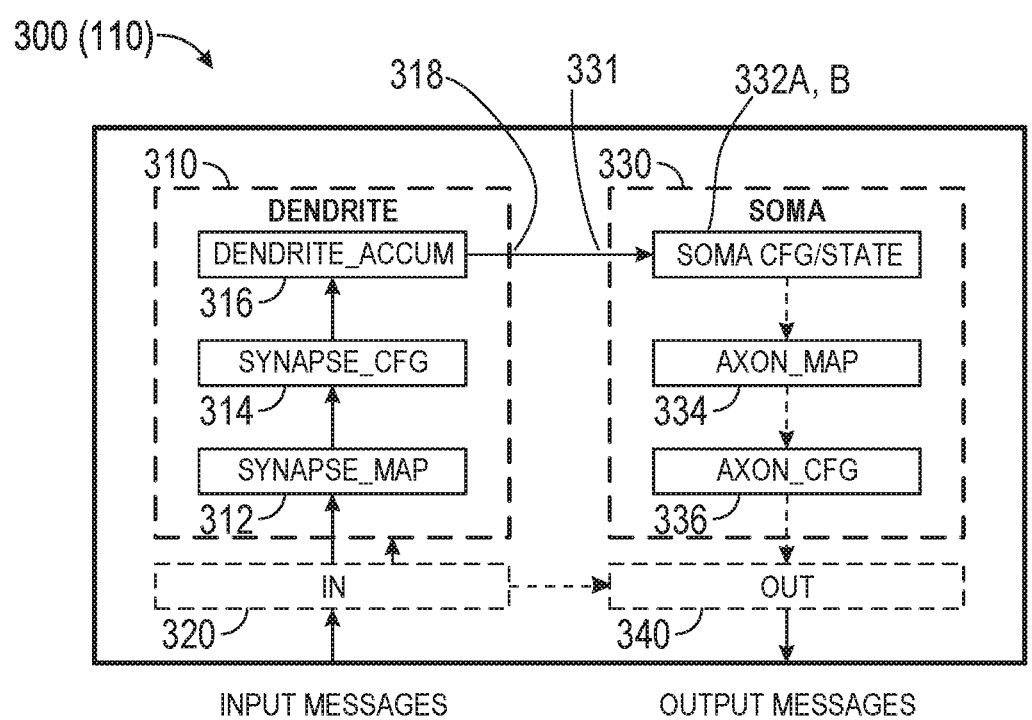
FIG. 3 is a block diagram that illustrates certain details of a neuromorphic core within the neuromorphic architecture in which the core's architectural resources are shared in a time-multiplexed manner, according to an example.

FIG. 3 is a block diagram 300 that illustrates certain details of a neuromorphic core within the neuromorphic architecture in which the core's 110 architectural resources are shared in a time-multiplexed manner to implement a plurality of neurons within the core. A dendrite logic circuit 310 may include an input circuit (interface) 320 to receive spike messages, a synapse map memory 312, a synapse configuration (CFG) memory 314, and a dendrite accumulator memory 316. A soma logic circuit 330 includes an output circuit (interface) 340 to provide spike messages produced by the soma circuit, a soma CFG/state memory 332, an axon map memory 334 and an axon CFG memory 336.

The spike-based model of neural computation is generally known as a SNN, sometimes considered the third generation of neural network model that advances the computational complexity of earlier Threshold Gate and Sigmoidal (rate) models of neurons. In an SNN, all communication occurs over event-driven action potentials, or spikes, that may convey no information other than the spike time as well as an implicit source and destination neuron pair. Computation occurs in each neuron as a result of the dynamic, nonlinear integration of weighted spike input using real-valued state variables.

Recurrence and dynamic feedback are elements of the SNN computational model. Alternative models of neuron network connectivity may be used to encompass the diverse range of neural connectivity algorithms inspired from real biological brains. The alternative network arrangements range from fully connected (all-to-all) to feed-forward trees to fully random 3D projections to so-called small world networks.

The homogeneous, two-dimensional network of cores shown in FIG. 1 supports these neural network connectivity models. All cores, and therefore, all neurons, may be fully connected through some number of router hops, and the fully configurable routing tables allow each core's neurons to distribute their spikes to any number of cores in the mesh. Depending on the SNN model and a particular hardware realization, memory resource constraints may limit the maximum network size and axon fan-out degree, but in principle the disclosed two-dimensional mesh network architecture supports fully arbitrary connectivity graphs.

Biological neurons include biological soma (body), biological axons, biological dendrites and biological synapses. The biological soma acts as an integrator that performs threshold spiking. Biological synapses provide interfaces between neurons. Biological axons provide long-distance output connections between a presynaptic and a postsynaptic neuron. Biological dendrites provide multiple, distributed inputs into neurons. In nature, each biological neuron occupies its own discrete volume in the brain, and dedicated axon and dendrite wiring structures communicate information from one neuron to another. Thanks to nanoscale self-assembly processes that begin during embryonic development and continuing throughout life, biology may achieve very high neuron and wiring densities. Such processes lead to extremely dense but very slow and unreliable circuitry. The wiring and computing properties of biological brains are plastic but relatively inflexible, adapting on time scales of minutes to years.

Very large-scale integration (VLSI) design technology, on the other hand, delivers much higher speed and more reliable circuits at the cost of lower density, higher assembly cost, much lower plasticity, and higher power. Furthermore, a network of neuromorphic cores is described herein that may implement the information processing algorithms as employed by the biological brain, but in a more programmable manner. While a biological brain may only implement a specific set of defined behaviors, as conditioned by years of development, a capability may be provided to rapidly reprogram neural parameters as represented in a network of neuromorphic cores. This may allow a neuromorphic processor that comprises a network of neuromorphic cores to realize a much broader range of behaviors than those provided by a single slice of biological brain tissue. Thus, the computing structures within the neuromorphic cores may differ significantly from their biological counterparts.

A significant architectural difference in the neuromorphic architecture compared to biology is the use of time-multiplexed computation in both the spike communication network and the neuron implementation. This allows the same physical circuitry to be shared among many neurons, effectively trading off computing speed in exchange for higher density. With time multiplexing, the network may connect N cores with O(N) total wiring length, whereas discrete point-to-point wiring would scale as $O(N^2)$. Given today's largely planar and non-plastic VLSI wiring technology, this reduction in required wiring resources is important.

In the cores, multiplexing allows storage of a computing state in the densest memory technology available, such as Static Random Access Memory (SRAM). These memory structures require time-multiplexed access due to the use of shared busses, address decoding logic, and other multiplexed logic elements. A neuron's state spans all of its synapses and all currents and voltages over its membrane, which is itself a large network of interacting components. In contrast, biological electrochemical rules that exist in nature that computationally operate on that state are simply described and relatively invariant from neuron to neuron. This motivates an architecture that prioritizes density of the memory technology, in an example, over everything else. The memory state grows as O(N) for N neurons, while time-multiplexing the computational logic gives O(1) area and energy cost of that component up to some maximum (large) N per core.

The minimizing of the cost of programming overhead introduces into the neuromorphic architecture programmability features not found in biological brains. More particularly, the same neuromorphic architecture used for routing spikes from core to core may be further multiplexed to carry configuration messages used by the core to configure the neurons that they implement. Thus, on-chip routing circuitry within the neuromorphic architecture may be configured to also route core configuration information.

A fully digital and deterministic circuit design style may be used to maximize VLSI technology speed and reliability advantages. This choice has wide-ranging implications spanning low-level circuits to high-level architecture. At the lowest level, a digital implementation employs circuits that bear little resemblance to the corresponding biological structures of biological synapses, biological dendrites, and biological neurons. For example, in some embodiments, the integration of synaptic current uses digital adder and multiplier circuits, whereas more "analog isomorphic" neuromorphic approaches common in prior work accumulate charge on capacitors in an electrically analogous manner to how neurons accumulate synaptic charge on their lipid membranes. The differences from biological counterparts are unimportant since the objective is to implement neural information processing algorithms in the most efficient manner possible using present day design technology, not to replicate biological form as a goal in and of itself.

At the architectural level, reliable and deterministic operation utilizes synchronization of time across the network of cores such that any two executions of the design, given the same initial conditions and configuration, should produce identical results. This contrasts with the distributed, decoupled, and asynchronous operation of biological brain matter.

For reasons relating to efficiency and performance, it remains desirable to preserve asynchrony at the circuit level, allowing individual cores to operate as fast and freely as possible, while maintaining determinism at the system level. This motivates abstracting the notion of time as a temporal variable in neural computations, separating it from the "wall clock" time that the hardware takes to perform the computation. This allows full leveraging of the speed advantage that complementary metal oxide semiconductor (CMOS) VLSI circuits provide compared to biological neurons.

As a consequence, a time synchronization mechanism is introduced that globally synchronizes the neuromorphic cores at discrete time intervals. The synchronization mechanism allows the system to complete a neural computation as fast as the circuitry allows, with a divergence between run time and the notion of biological time that the neuromorphic system models.

Figure 4:
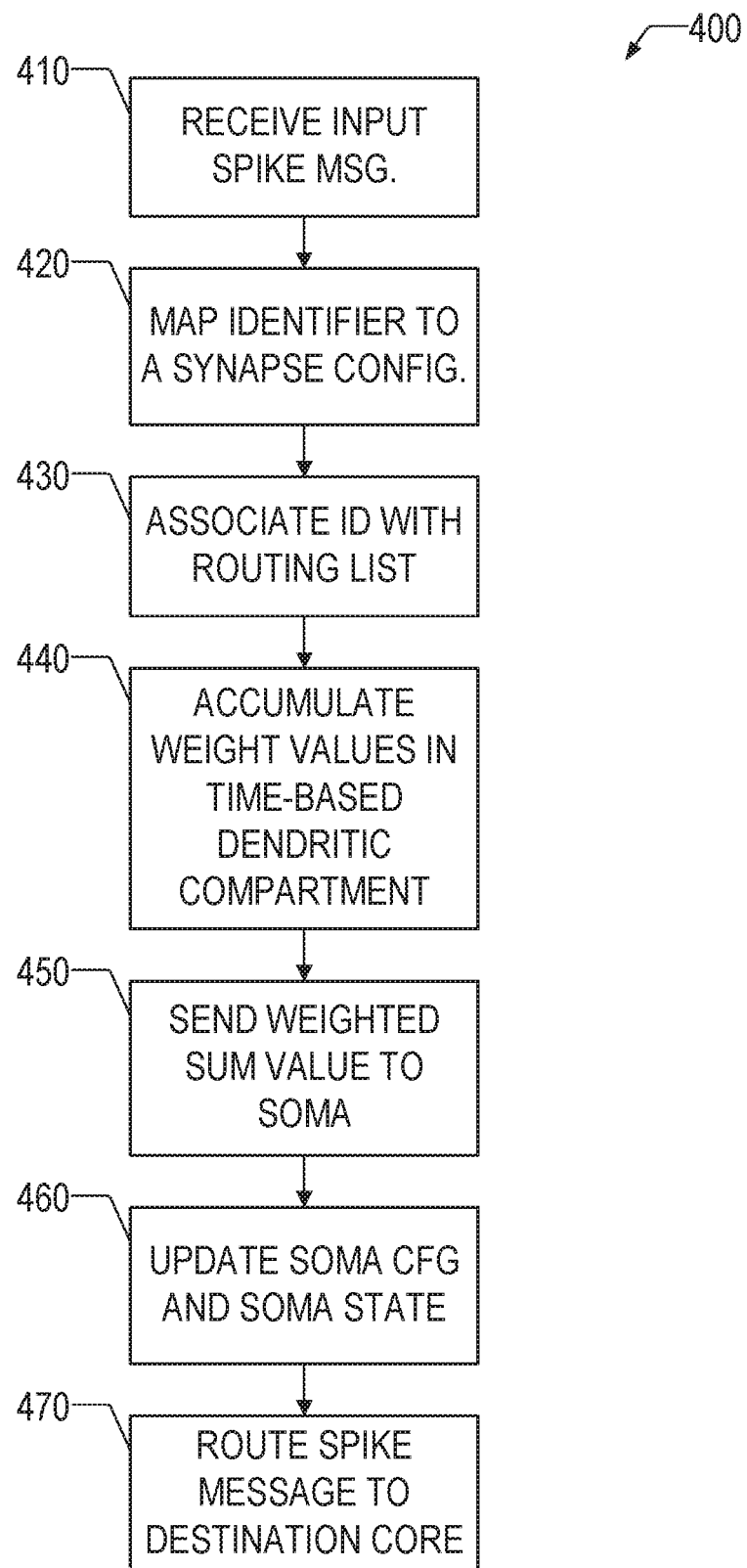
FIG. 4 is a flowchart illustrating a method for processing a dendritic compartment, according to an example.

FIG. 4 is a basic flowchart 400 providing an example of operations that could be performed in the process. In operation 410, the dendrite receives an input spike message, and in operation 420 an identifier, such as the AxonID, is mapped to a synapse configuration. In operation 430, the identifier is associated with a routing list. In operation 440, weight values are accumulated in time-based sections of a dendritic compartment in an accumulator. In operation 450, a weighted sum value for the dendritic compartment is sent to the soma. In operation 460, the soma configuration and soma state are updated based on the weighted sum value. In operation 470, a spike message is routed to the destination core.

Figure 5A:
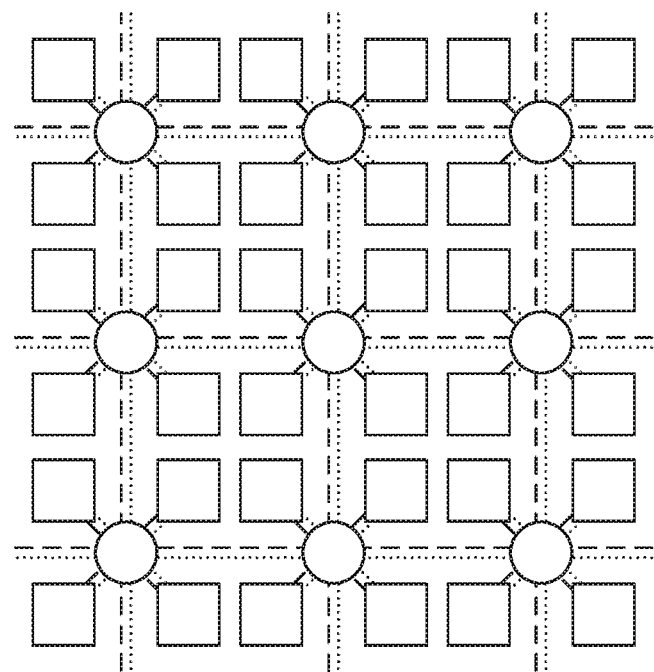
FIGS. 5A-5D are illustrative pictorial drawings representing a synchronized global time step with asynchronous multiplexed core operation, according to an example.
Figure 5B:
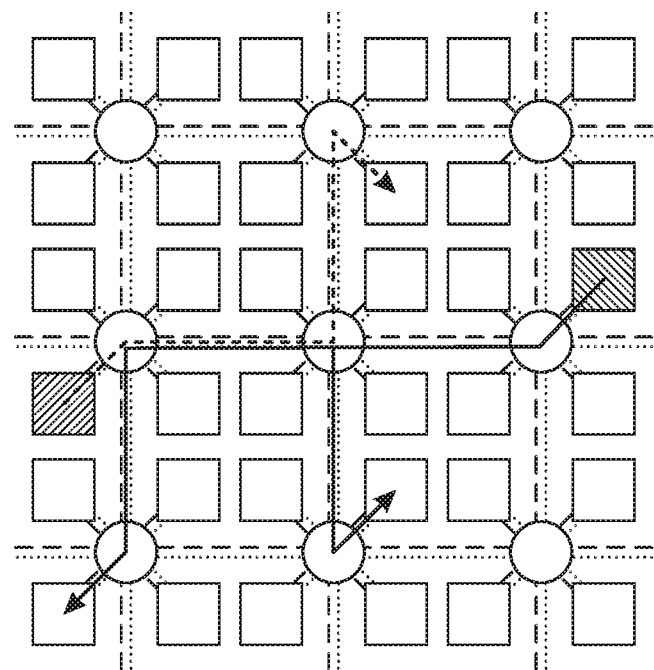
Figure 5C:
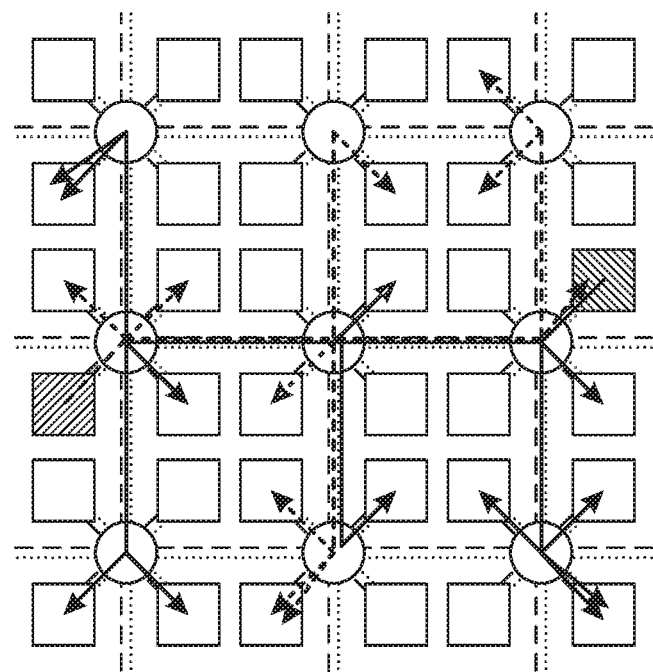
Figure 5D:
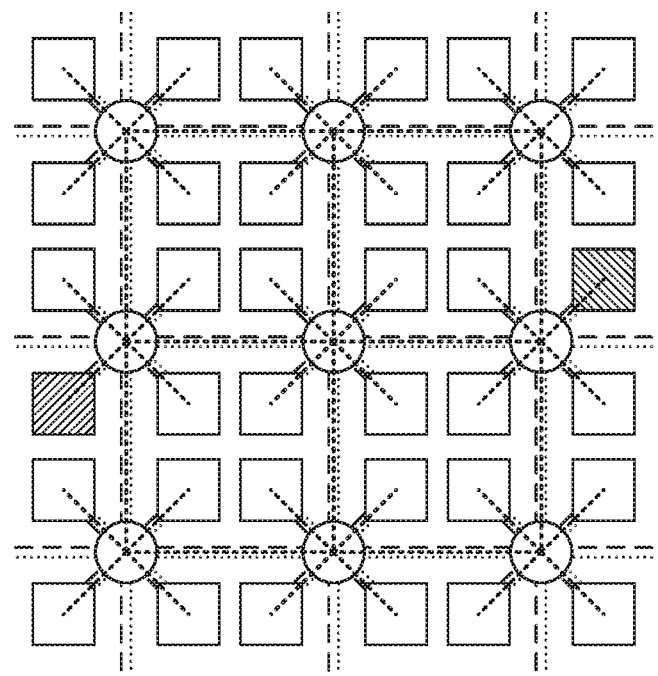

FIGS. 5A-5D are illustrative pictorial drawings representing a synchronized global time step with asynchronous multiplexed core operation. FIG. 5A represents the neuromorphic mesh in an idle state with all cores inactive. FIGS. 5B-5C represent cores generating spike messages that the mesh interconnects via routes to the appropriate destination cores. FIG. 5D represents each core handshaking with its neighbors for a current time step using special barrier synchronization messages. As each core finishes servicing the neurons that it services during a current time step, it handshakes with its neighbors to synchronize spike delivery. More particularly, these barrier synchronization messages flush the mesh of all spike messages in flight, allowing the cores to safely determine that all spikes have been serviced. At that point all cores are synchronized, allowing them to advance their time step and return to the initial state of FIG. 5A, beginning at the next time step. Thus, upon completion of barrier synchronization, all spikes launched during the time step have been delivered and a next time step may begin with no spikes in flight.

Each core may use varying amounts of real time to complete each time step, depending on the activity of its neurons and the number of spikes it receives. Thus the real time used to complete the computation for one modeled time step may vary globally. The barrier synchronization mechanism allows the system to advance as fast as possible from time step to time step, limited only by computational activity. Note that a synchronous clocked design would have to wait the worst-case duration on every time step, with worse overall performance.

In nature, biological neurons achieve computational precision by coordinating across populations of neurons, such as with population coding, sparse coding, and other encoding schemes. The great abundance, poor reliability, and low energy cost of biological neurons make such an encoding strategy the optimal one. However, for today's VLSI technology, it is more optimal to exploit circuit reliability to perform higher precision calculations per modeled neuron. This allows amortization of higher neural overhead costs over the entire computational workload. Nevertheless, different neural algorithms use different degrees of synaptic precision, so a maximally efficient neuromorphic design efficiently supports a range of precisions depending on the problem.

A deterministic and reliable design implementation does not preclude support for stochastic models of neural computation, such as probabilistic inference and neural sampling. In the same way that conventional processors integrate pseudorandom number generators for various purposes, the neuromorphic architecture herein may integrate pseudorandom numbers for stochastic computation applications without sacrificing deterministic operation.

As discussed above with respect to FIG. 3, the neuromorphic neuron core 300 may comprise two loosely coupled asynchronous components: (1) an input dendrite logic circuit 310 configured to receive spikes from the routing network 130 and to apply them to the appropriate destination dendrite compartments at the appropriate future times, and (2) a soma logic circuit 330 configured to receive each dendrite compartment's accumulated values for the current time and to evolve each soma's membrane potential state to generate outgoing spike messages at the appropriate times. From a biological perspective, the dendrite logic circuits 310 and soma logical logic circuits 330 only approximate the roles of corresponding biological components in nature.

Figure 6:
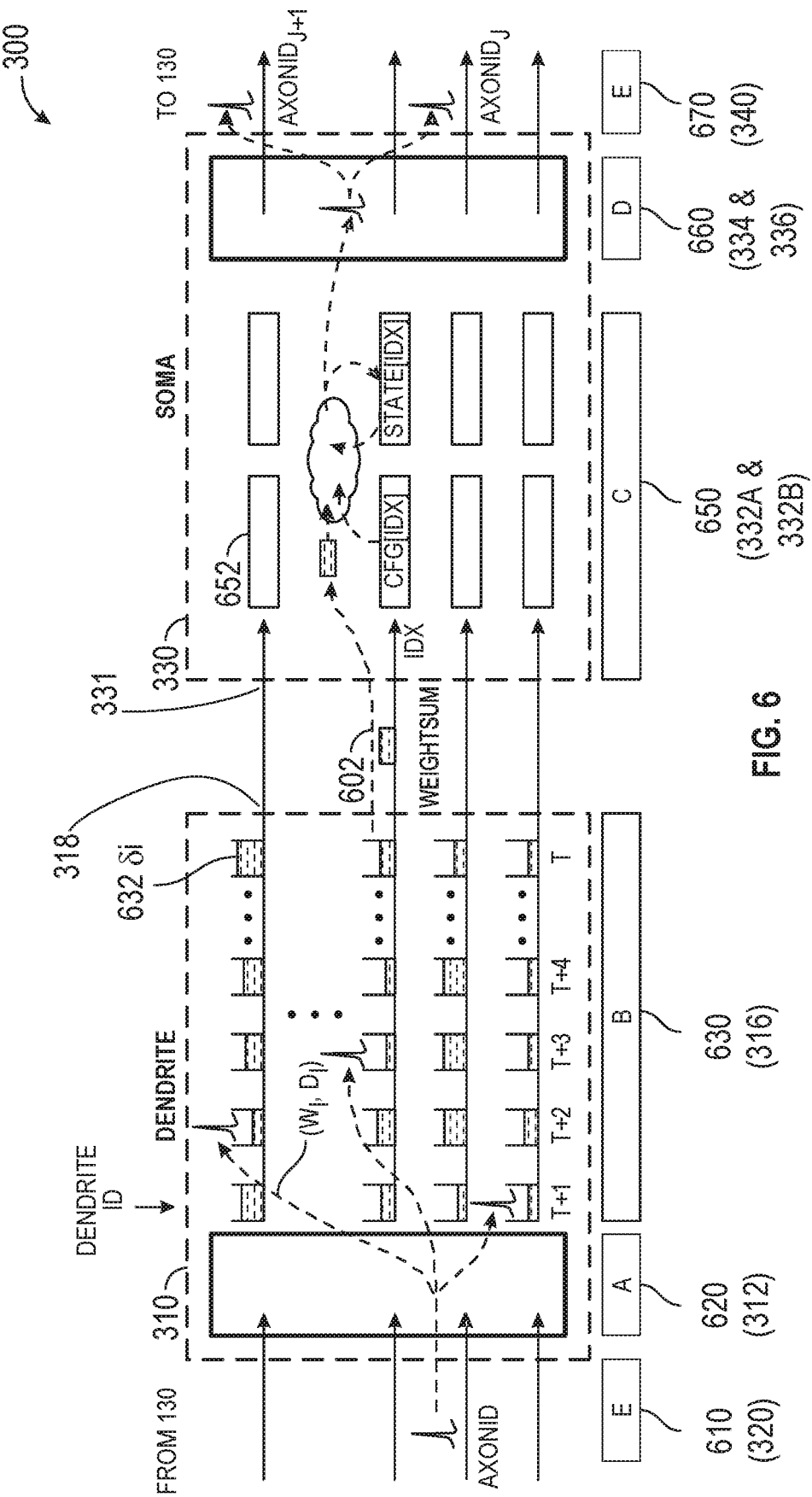
FIG. 6 is an illustrative pictorial internal architecture level drawing representing an example of an operation of a dendrite logic circuit 310 and of a soma logic circuit 330 of a neuromorphic neuron, according to an example.

FIG. 6 is an illustrative pictorial internal architecture level drawing representing an example of an operation of a dendrite logic circuit 310 and of a soma logic circuit 330 of a neuromorphic neuron. It will be appreciated that these dendrite logic circuit 310 components and soma logic 330 circuit components are shown as uniquely wired channels for conceptual purposes only. The hardware services provided by the soma (e.g., axon) logic circuits 330 and dendrite logic circuits 310 may be dynamically configured in a time-multiplexed manner to share the same physical wiring resources within a core among multiple neuromorphic neurons implemented by the core.

In accordance with an example of the basic multi-stage data flow of spike handling in the neuromorphic architecture, at stage (E) 610, input spikes are received over the network 130 at the input circuit 320 of a dendrite process 310. At stage (A) 620, the input spikes are distributed by the dendrite process 310 to multiple fan-out synapses within the core with appropriate weight and delay offset (W, D) via the SYNAPSE_MAP 312. At stage (13) 630, the dendrite 310 maintains sums of all received synaptic weights for future time steps over each dendritic compartment 632 in the dendrite accumulator memory 316. That is, weights targeted for a particular dendrite ID and delay offset time are accumulated/summed into a dendritic compartment address 632. At stage (C) 650, WeightSum values are transferred to soma 330 for handling at time T, where soma configuration (CFG) 332A and soma state (STATE) 332B memory values may be updated for the corresponding soma compartment idx 652. At stage (D) 660, output spikes, when generated, may be mapped to the appropriate fan-out AxonIDs for all destination cores via the AXON_MAP memory 334. At stage (E) 670, output spike messages are routed to the appropriate fan-out cores at the output circuit 340 via the network 130.

The dendrite logic circuit 310 may perform the following functions at synchronization time step T (this is a global time step that the barrier synchronization mechanism ensures is consistent across the cores during spiking activity and servicing of the dendritic accumulators for time T, as described above with respect to FIGS. 5A-5D—synchronizing and flushing of spikes that are in flight within the network):

1) Receive and handle spike messages as they serially arrive in time-multiplexed fashion from the network. Each message specifies an "Axon ID" unique to the core that identifies a distribution set of dendrites within the core. Each element of the distribution set is referred to as synapse, specifying a dendrite number, a connection strength (weight W), a delay offset (D∈[1, $D_{MAX}$]), and a synapse type. For some synapse types, each weight Wi is added to the destination dendrite $\delta_i$'s total neurotransmitter amount (WeightSum) scheduled for servicing at time step T+$D_i$ in the future.

2) While not handling input spikes, the dendrite logic circuit process 310 serially services all dendrites $\delta_i$ sequentially, passing the total accumulated neurotransmitter value amounts for time T to the Soma stage, resetting the neurotransmitter totals to zero so the state may be repurposed for a future step (namely time step T+$D_{MAX}$+1, in circular FIFO fashion).

The soma logic circuit 330 models the time evolution of each soma's state variables over time in response to the synaptic input received from the dendrite 310 in function 2 above. The computational units in the soma process 330 are referred to herein as compartments.

For each compartment $\delta_i$, the soma 330 receives the total accumulated neurotransmitter amount at time T, (WeightSum in FIG. 6), which may be zero, and updates all of the compartment's state variables according to its configured neural model. Soma compartments 652 generate outgoing spike events in response to a sufficiently high level of activation. After compartment $\delta_i$ has been updated, the soma process 330 advances to the next compartment $\delta_{i+1}$, and so on until all compartments 632, 652 in the core have been serviced. At that point, the core engages in barrier synchronization and proceeds to the next time step T+1 when the rest of the neuromorphic mesh is ready.

Figure 7:
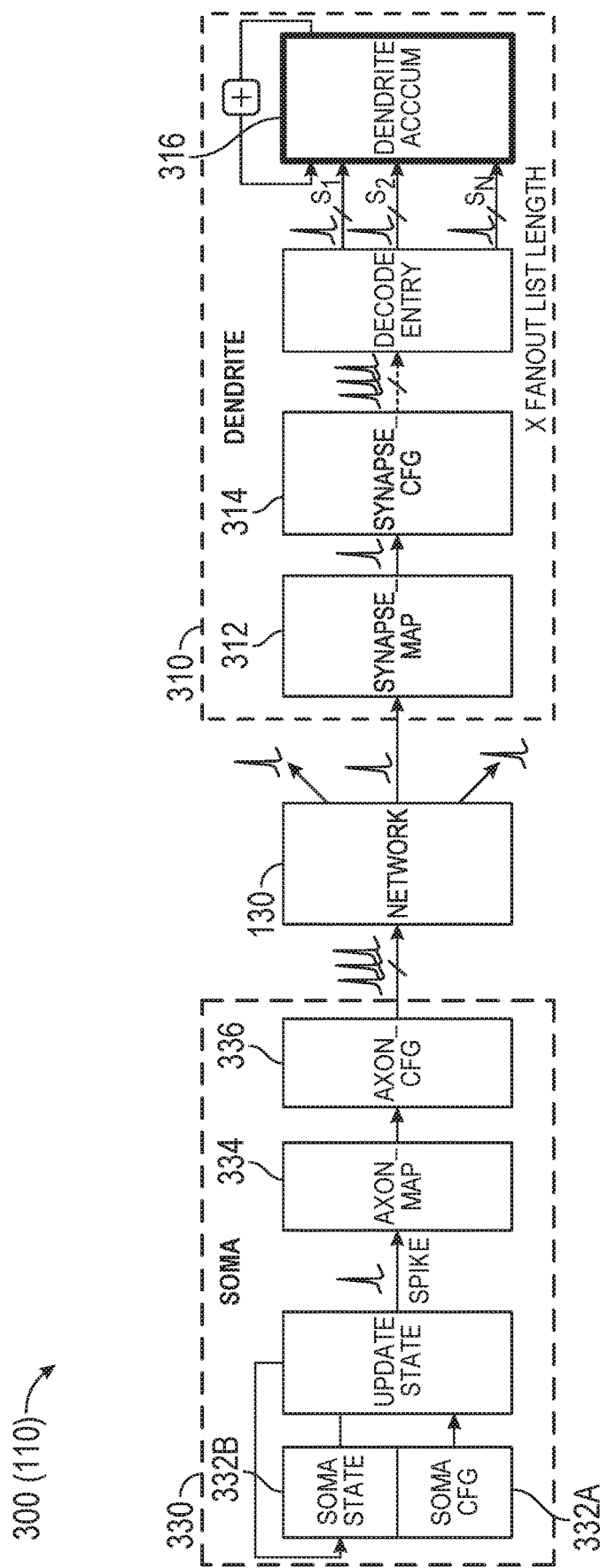
FIG. 7 is an illustrative block diagram showing additional details of the neuromorphic core, according to an example.

FIG. 7 is an illustrative block diagram showing additional details of the neuromorphic core 300 of FIG. 3 and also showing certain details of the life cycle of one neuron's spike as it propagates through the network 130, dendrite 310, and soma 330. Communication and computation in the neuromorphic architecture occurs in an event driven manner in response to spike events as they are generated and propagated throughout the neuromorphic network. Note that the soma 330 and dendrite 310 components shown in FIG. 7, in general, will belong to different physical cores.

Although the spikes in FIG. 7 are illustrated as analog voltage spikes, in an actual hardware neuromorphic architecture implementation, spikes are represented digitally in different forms at different points in the pipeline. For example, when traversing the neuromorphic network, the spikes may be encoded as short data packets identifying a destination core and Axon ID.

Each stage in the spike data flow is described below.

SOMA_CFG 332A and SOMA_STATE 332B: A soma 330 spikes in response to an accumulated activation value upon the occurrence of an update operation at time T. Each neuron in a core 300 has, at minimum, one entry in each of the soma CM memory 332A and the soma STATE memory 332B. On each synchronization time step T, the configuration parameters for each neuron are read from SOMA_CFG 332A in order to receive the incoming weighted neurotransmitter amounts received from dendrites corresponding to the neuron, and to update soma state values accordingly. More particularly, each neuron's present activation state level, also referred to as its Vm membrane potential state, is read from SOMA_STATE 332B, updated based upon a corresponding accumulated dendrite value, and written back. In some embodiments, the accumulated dendrite value may be added to the stored present activation state value to produce the updated activation state level. In other embodiments, the function for integrating the accumulated dendrite value may be more complex and may involve additional state variables stored in SOMA_STATE 332B. The updated Vm value may be compared to a threshold activation level value stored in SOMA_CFG 332A and, if Vm exceeds the threshold activation level value in an upward direction, then the soma produces an outgoing spike event. The outgoing spike event is passed to the next AXON_MAP 334 stage, at time $T+D_{axon}$, where $D_{axon}$ is a delay associated with the neuron's axon, which also is specified by SOMA_CFG 332A. At this point in the core's pipeline, the spike may be identified only by the core's neuron number that produced the spike. If the updated Vm value exceeds the threshold, then the stored activation level may be reset to an activation level of zero. If the updated Vm value does not exceed the threshold, then the updated Vm value may be stored in the SOMA_STATE memory 332B for use during a subsequent synchronization time step.

AXON_MAP 334: The spiking neuron index is mapped through the AXON_MAP memory table 334 to provide a (base_address, length) pair identifying a list of spike fan-out destinations in the next table in the pipeline, the AXON_CFG 336 routing table. AXON_MAP 334 provides a level of indirection between the soma compartment index and the AXON_CFG 336 destination routing table. This allows AXON_CFG's 336 memory resources to be shared across all neurons implemented by the core in a flexible, non-uniform manner. In an alternate embodiment, the AXON_MAP 334 state is integrated into the SOMA_CFG 332A memory. However, splitting this information into a separate table saves power since the AXON_MAP 334 information is only needed when a neuron spikes, which is a relatively infrequent event.

AXON_CFG 336: Given the spike's base address and fan-out list length from AXON_MAP 334, a list of (dest_core, axon_id) pairs is serially read from the AXON_CFG 336 table. Each of these becomes an outgoing spike message to the network 130, sent serially one after the other. Since each list is uniquely mapped by neuron index, some neurons may map to a large number of destinations (i.e., a multicast distribution), while others may only map to a single destination (unicast). List lengths may be arbitrarily configured as long as the total entries do not exceed the total size of the AXON_CFG 336 memory.

NETWORK 130: The network 130 routes each spike message to a destination core in a stateless, asynchronous manner. From the standpoint of the computational model, the routing happens in zero time, i.e., if the spike message is generated at time T, then it is received at the destination core at time T relative to the source core's time step. (Note: due to possible barrier synchronization non-determinism, if so configured, the destination core may receive the message at a time step $T \pm \Delta D_{BS}$, where $\Delta D_{BS}$ is the maximum barrier synchronization delay of the system.) The AxonID spike packet payload is an opaque identifier interpreted uniquely by the destination core and has no meaning to the network 130.

SYNAPSE_MAP 312: As each spike message is received by its destination core, the AxonID identifier from the spike message's payload is mapped through the SYNAPSE_MAP 312 table to give a (base_address, length) pair that corresponds to one or more dendrites of the neuron identified in the spike message. This lookup is directly analogous to the AXON_MAP 334 table lookup. The mapping assigns a list of local synapses that specify connections to dendrite compartments within the core. Note that each AxonID mapped by the source core's AXON_CFG 336 entry is meaningful only to the destination core, so there are no global allocation constraints on the AxonID space. In an alternative embodiment, similar to AXON_MAP 334, the (base_address, length) information mapped by SYNAPSE_MAP 312 is specified directly from AXON_CFG 336 and sent as the spike payload, instead of AxonID. However, the use of the SYNAPSE_MAP 312 indirection allows the AXON_CFG memory 336 and the spike payload to be smaller, thereby saving overall area and power for large systems.

SYNAPSE_CFG 314: Similar to AXON_CFG 336, SYNAPSE_CFG 314 is a memory of variable-length routing lists that are shared among all of the core's dendritic compartments. However, unlike AXON_CFG 336, each entry in SYNAPSE_CFG 314 has a highly configurable format. Depending on the needs of the particular neuromorphic algorithm used, formats may be specified that provide more or less information per synapse, such as higher weight and delay precision. SYNAPSE_CFG 314 is a direct-mapped table, with each mapped entry having a fixed bit width, so higher precision fields imply fewer synapses per entry, and lower precisions enable more synapses per entry. In general, each SYNAPSE_CFG 314 entry is uniquely decoded to produce a set of synaptic connections, with each synaptic connection being a (DendriteIdx, Weight, Delay) triple. The Delay is not necessary, and other variables could optionally be included in general, this may be referred to as an n-tuple. Hence a list of m SYNAPSE_CFG 314 entries as specified by the SYNAPSE_MAP 312 entry will become a set of $(\Sigma_{i=1}^{m} n_i)$ synaptic connections, where $n_i$ is the number of synapses in the $i^{th}$ SYNAPSE_CFG 314 entry in the list.

DENDRITE_ACCUM 316: Finally, each spike's synaptic connections map to counters within the dendrite compartment that maintain the sum of all weighted spikes received for future handling by soma. DENDRITE_ACCUM 316 is a two-dimensional read-modify-write memory indexed by (DendriteIdx, $(T+Delay) \% D_{MAX}$), where "%" is the modulo operator. As described earlier, the T+Delay term identifies the future time step at which the soma will receive the spike. The % $D_{MAX}$ modulo operation implements a circular scheduler buffer. The read-modify-write operation simply linearly accumulates the received synaptic weight:

$$DENDRITE\_ACCUM[idx,(T+D)\% \ D_{MAX}]=DENDRITE\_ACCUM[idx,(T+D)\% \ D_{MAX}]+W.$$

As described above, at each time step T, the soma 330 receives an accumulation of the total spike weight received (WeightSum) via synapses mapped to specific dendritic compartments. In the simplest case, each dendritic compartment maps to a single neuron soma. This configuration implements a single-compartment point neuron model, consistent with nearly all previous neuromorphic frameworks and hardware designs published to date. An extension of this architecture is disclosed in a concurrently-filed patent application by Applicant, titled "MULTI-COMPARTMENT DENDRITES IN NEUROMORPHIC COMPUTING" and identified by docket identifier 884.Z70US1, herein incorporated in its entirety by reference, and provides an example disclosure of multi-compartment neuron models.

The SOMA_CFG 332A and SOMA_STATE 332B memories serve as the basic architectural ingredients from which a large space of SNN models may be implemented. Simpler models may minimize the size of these memories by modeling synaptic input responses with single-timestep current impulses, low state variable resolution with linear decay, and zero-time axon delays. More complex neuron models may implement higher resolution state variables with exponential decay, multiple resting potentials per ion channel type, additional neuron state variables for richer spiking dynamics, dynamic thresholds implementing homeostasis effects, and multiple output spike timer states for accurate burst modeling and large axonal delays. These variations in neuron model features represent choices over a spectrum of functionality localized to the soma stage in the architecture. Greater neuroscience detail costs higher SOMA_CFG 332A and SOMA_STATE 332B resources and greater logic area and power, while cruder neuroscience models use fewer resources and lower power. The neuromorphic architecture herein supports a very wide spectrum of such choices.

The soma configuration in some embodiments implements a simple current-based Leaky Integrate-and-Fire (LIF) neuron model. The subthreshold dynamics of the LIF neuron model are described by the following discrete-time dimensionless difference equations:

$$u[t] = \left(1 - \frac{1}{\tau_s}\right)u[t-1] + \sum_{i \in I} w_i s_i[t]$$

$$v[t] = \left(1 - \frac{1}{\tau_m}\right)v[t-1] + u[t] + b$$

where:

$\tau_s$ and $\tau_m$ are synaptic and membrane time constants, respectively;

I is the set of fan-in synapses for the neuron;

$w_i$ is the weight of synapse i;

$S_i[t]$ is the count of spikes received for time step t at synapse i, after accounting for synaptic delays; and b is a constant bias current.

For computational efficiency, the exponential scalings are configured and scaled according to the following fixed-point approximation:

$$\left(1 - \frac{1}{\tau}\right) \approx \frac{4096 - D}{4096}$$

where the D decay constants ($D_s$ and $D_m$) may range over [0, 4096], corresponding to $\tau$ time constants nonlinearly spaced over the range $[1, \infty]$.

When the membrane voltage v[t] passes some fixed threshold θ from below, the neuron schedules an output spike for $t+T_{axon}$ based on a constant configured axon delay ($T_{axon} \in [0,15]$), and v[t] is mapped to 0. The membrane potential is held at 0 until $t+T_{ref}$ where $T_{ref}$ is the refractory delay, which may be specified as a constant in SOMA_CFG 332A or configured to be pseudo randomly generated.

Due to the high connectivity fan-outs in neuromorphic architectures, the state associated with synaptic connections dominates the physical cost of hardware realizations of SNNs. Mammalian neurons commonly have on the order of 10,000 synapses. A synapse generally may be reasonably modeled with a small number of bits, on the order of eight to fifty less state and configuration needed for the LIF soma state. Thus in a biologically faithful hardware implementation with 10,000 synapses per neuron, where all of these parameters are either uniquely programmable or dynamic, synaptic state dominates by a factor of well over 200.

Furthermore, depending on the SNN algorithmic application used by the neuromorphic network, the range of fan-outs per neuron and the range of synaptic state may vary considerably. For example, some pattern matching algorithms call for only a single bit of weight precision per synapse, whereas others rely on real-valued connectivity weights encoded with up to eight bits per synapse. Other algorithmic features such as temporal coding, polychronous computation, and dynamic learning may add considerably more state per synapse. The synaptic connectivity of some algorithms have simple all-to-all connectivity between the neurons which may be simply specified in dense matrix form. Many other algorithms assume sparse connectivity between neurons, or by some dynamic pruning process converge to a sparse network that cannot be represented efficiently with dense matrices. All told, the amount of desired state per synapse may span over a range of 10× and higher, depending on the application need.

The neuromorphic architecture described herein advantageously supports a broad range of such synaptic connectivity models. The neuromorphic architecture described herein leaves it up to software to program the desired level of synaptic precision and mapping flexibility, subject to total memory size constraints.

The capability to support a wide range of synaptic connectivity models arises from the following ingredients:

The SYNAPSE_MAP/SYNAPSE_CFG 312/314 and AXON_MAP/AXON_CFG 334/336 pairs of mapping tables on each core's ingress and egress sides, respectively. Each pair's MAP table provides the indirection needed to allocate variable-length connectivity lists anywhere in the subsequent CFG memory. This allows the CFG memory entries to be shared among the neural resources contained within the core.

Figure 8:
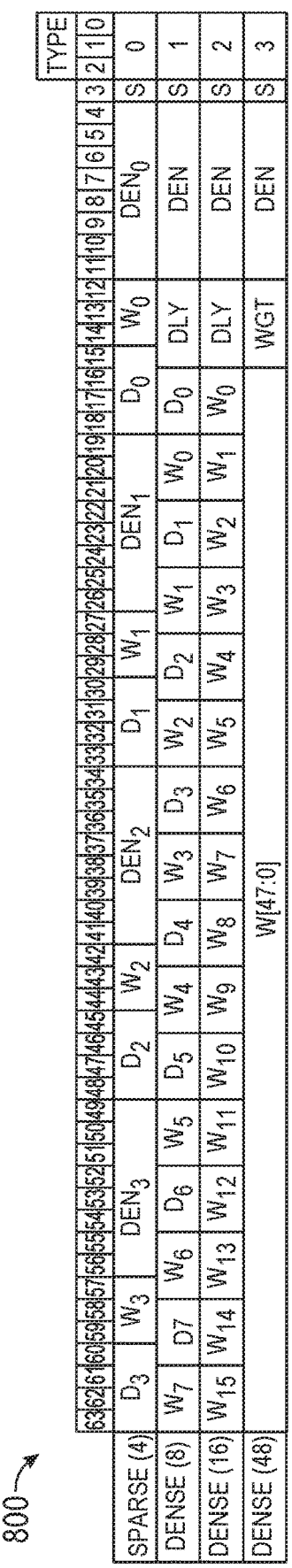
FIG. 8 is an example data table structure showing different example synapse configuration entry formats, according to an example.

Each memory address of SYNAPSE_CFG 314 maps to an entry whose format is explicitly specified by the entry itself. For example, in some neuromorphic network embodiments, only bits 2:0 have a fixed interpretation over all SYNAPSE_CFG 314 entries. This field specifies one of eight formats over the rest of the bits in the entry. Depending on the entry type, different precisions of synaptic parameters are encoded. Entry formats with lower precision parameters support more synapses, while higher precision parameters may be specified if desired at the expense of fewer synapses in the entry. A few example entry types are illustrated in FIG. 8, described in more detail below.

Similarly, the entries in the AXON_CFG 336 memory may likewise encode different spike message types. This allows spikes traveling shorter distances from the source core to consume fewer resources since the information used to identify a destination core increases with its distance. In particular, spikes destined to cores physically located on different integrated circuit chips may use a hierarchical address, with the higher-level hierarchical portion of the address stored in additional AXON_CFG 336 entries.

Since the space of useful encoding formats may exceed the number of formats any particular core typically needs, further indirection in the format determination provides additional flexibility with lower hardware cost. The TYPE field (bits 2:0) described above may index a global SYNAPSE_CFG_FORMAT table that parametrically maps the three-bit field to a richer encoding format specified by many more bits.

In order to normalize different ranges of parameter values across the variable precisions of different SYNAPSE_CFG 314 entries, each format has a further programmable indirection table associated with it. For example, if the native DENDRITE_ACCUM 316 input bit width is 8 bits, then a 1-bit synaptic weight W from a SYNAPSE_CFG 314 entry may be mapped through a two-entry, 8 b-valued table to give the full-precision values associated with the '0' and '1' programmed W values.

Figure 9:
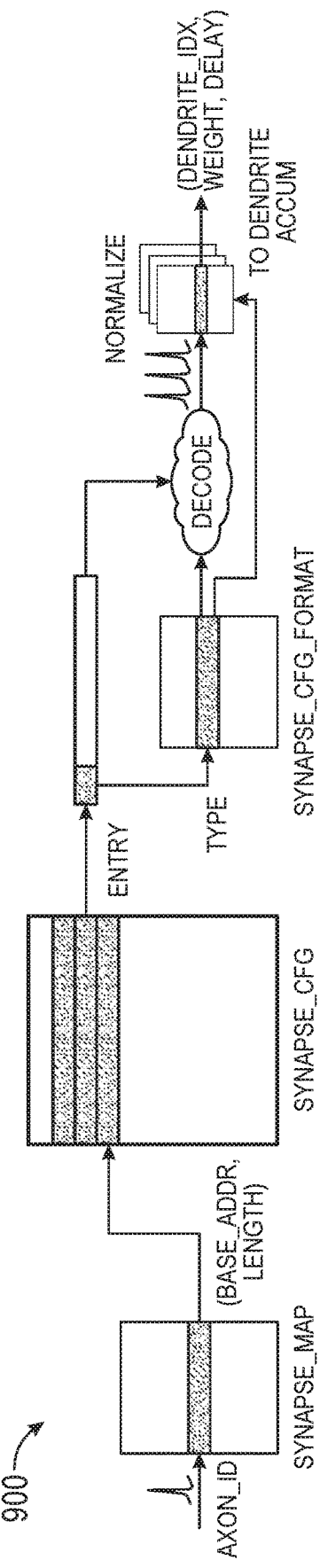
FIG. 9 is a block diagram showing a fully general synaptic mapping data flow within dendrite logic circuitry, according to an example.

The fully general synaptic mapping architecture covering the above points is shown in FIG. 9, discussed in more detail below. This diagram shows a flexible synaptic mapping structure supported by the neuromorphic architecture, a generalization that includes the SYNAPSE_CFG_FORMAT and NORMALIZE stages.

FIG. 8 is an example data table structure 800 showing different example synapse configuration (SYNAPSE_CFG 314) entry formats. The $W_i$ and $D_i$ fields indicate individual synapse weight and delay values, respectively, that vary between the entry types. The $DEN_i$ fields indicate dendrite compartment addresses. The Dense entries are vectorized in the sense that the DEN field specifies a base dendrite address with ($W_i$, Di) applying to DEN+i.

FIG. 8 also illustrates an example of an entry format comprising only weight fields without any delays (the Dense 48-synapse Type 3 format). In this case, each axon_id maps to a (dendrite_idx, weight) pair. In fact, many embodiments may only support pairwise mappings of this form, since the elimination of synaptic delays saves considerable area in the core implementation. Such a simplified embodiment only requires a minimum of two time step accumulators 632 per dendrite index and provides a higher weight storage capacity in the SYNAPSE_CFG memory 314.

FIG. 9 is a block diagram showing a fully general synaptic mapping data flow 900 within dendrite logic circuitry. The data flow begins with an axon_id identifier from an ingress spike message, and produces a variable-length list of (dendrite_idx, weight, delay) tuples.

Compared to the commonly used dense matrix or crossbar based synaptic mapping schemes found in the prior art, the flexibility provided by the above features comes at the possible expense of additional tables, overhead bit fields such as TYPE, and extra decoding logic. However, this overhead may diminish significantly for more complex synaptic networks requiring more bits of weight and delay per synapse and, especially, for networks with sparse connectivity patterns.

High connectivity fan-out is one of the most profoundly different properties of neural architectures compared to standard computing architectures. Whereas logic gates in conventional processors typically connect to 5-10 other gates, biological neurons pervasively connect to 10,000 other neurons, and sometimes to as many as 175,000 in the case of Purkinje cells in the cerebellar cortex.

Typical neuromorphic hardware designs published generally fall far short of the biological averages, with typical fan-outs of 128, 256, and 512. Prior hardware designs lack the flexibility of the neuromorphic architecture to mix sparse and dense synaptic connectivity patterns, and as a result their typical realized fan-out values may be significantly lower than their nominal provisioning.

Fan-out is an important parameter due to the rapid growth of combinatorial scaling. Neural data encodings are fundamentally sparse. A typical two percent sparse activation of 128 neurons gives a code with the representational capacity of a 16-bit number. Two percent activations of 256 and 512 neurons provide the representational capacity of slightly more than 32 and 64 bit numbers, respectively. These are unremarkable capacities, corresponding to the mainstay bus sizes found in conventional computing hardware today. On the other hand, a sparse two percent activation of 10,000 neurons gives an unfathomably large number of states (over $2^{1400}$), far exceeding the number of atoms in the universe. This practically infinite number provides enormous benefits in terms of fault tolerance and robustness to stochastic sampling.

Today's neuromorphic designs may be limited in fan-out largely due to the cost of the densest memory technologies increases as $N^2$, where N is the number of fan-out desired. Ten thousand neurons connecting to ten thousand other neurons uses, at minimum, $(10^4)^2$ bits of connectivity state, costing upwards of a billion transistors or approximately 1 $cm^2$ of silicon area. With future memory technologies (especially those utilizing three dimensions), the manufacturing cost of such large connectivity matrices could drop dramatically, but until then, true biological-level fan-outs will remain costly.

However, the above analysis overlooks an important property of many practically useful neural networks: they have highly redundant connectivity. This is best exemplified by the recent widespread adoption of Convolutional Neural Networks (ConvNets) for state-of-the-art machine learning applications. These non-spiking image processing networks apply a single feed-forward convolutional kernel of connectivity weights across many different patches of an image in a serialized, time-multiplexed manner. The weight matrix only needs to be specified and stored in hardware once per feature rather than once per feature per patch. The biological brain's visual cortex, on the other hand, encodes its analogous convolutional kernels redundantly in a topographically distributed manner. Its image processing happens fully in parallel requiring far greater connectivity.

The neuromorphic architecture in some embodiments extends and generalizes the convolutional kernel concept for recurrent SNNs. In addition to its conventional direct neuron-to-neuron connectivity model, it supports a connectivity model that specifies connectivity hierarchically in terms of population types that may be bound to many different specific neuron populations.

This feature works very well to compress the connectivity redundancy found in many SNN networks of practical value. For example, in a neuromorphic architecture in accordance with some embodiments, sparse coding networks solving LASSO optimization, described in R. Tibshirani, "Regression Shrinkage and Selection via the Lasso," Journal of the Royal Statistical Society Series B, vol. 58, no. 1, pp. 267-288, 1996, are able to achieve fan-outs of up to 2016 averaged over all neurons in the network; 16 times higher than the design's theoretical maximum at the same synaptic precision without the feature.

Stochastic constraint satisfaction networks, as described in Z. Jonke, S. Habenschuss and W. Maass, "Solving Constraint Satisfaction Problems with Networks of Spiking Neurons," Front. Neurosci., vol. 10, no. 118, 2016, also greatly benefit from this feature. In these networks, each state variable in the problem (for example, the $N^{th}$ city visited in the Traveling Salesman problem) is represented as a Winner-Take-All (WTA) network over the M states the variable may assume. Since each variable type typically appears many times in the problem (e.g., over the number of segments in the Traveling Salesman's path), the WTA network weights redundantly appear in the network many times. Hence they are directly amenable to hierarchical representation via a population connectivity feature of a neuromorphic architecture in accordance with some embodiments. For a Traveling Salesman problem with twenty cities, the feature reduces the WTA network's synaptic resources by a factor of twenty.

Figure 10:
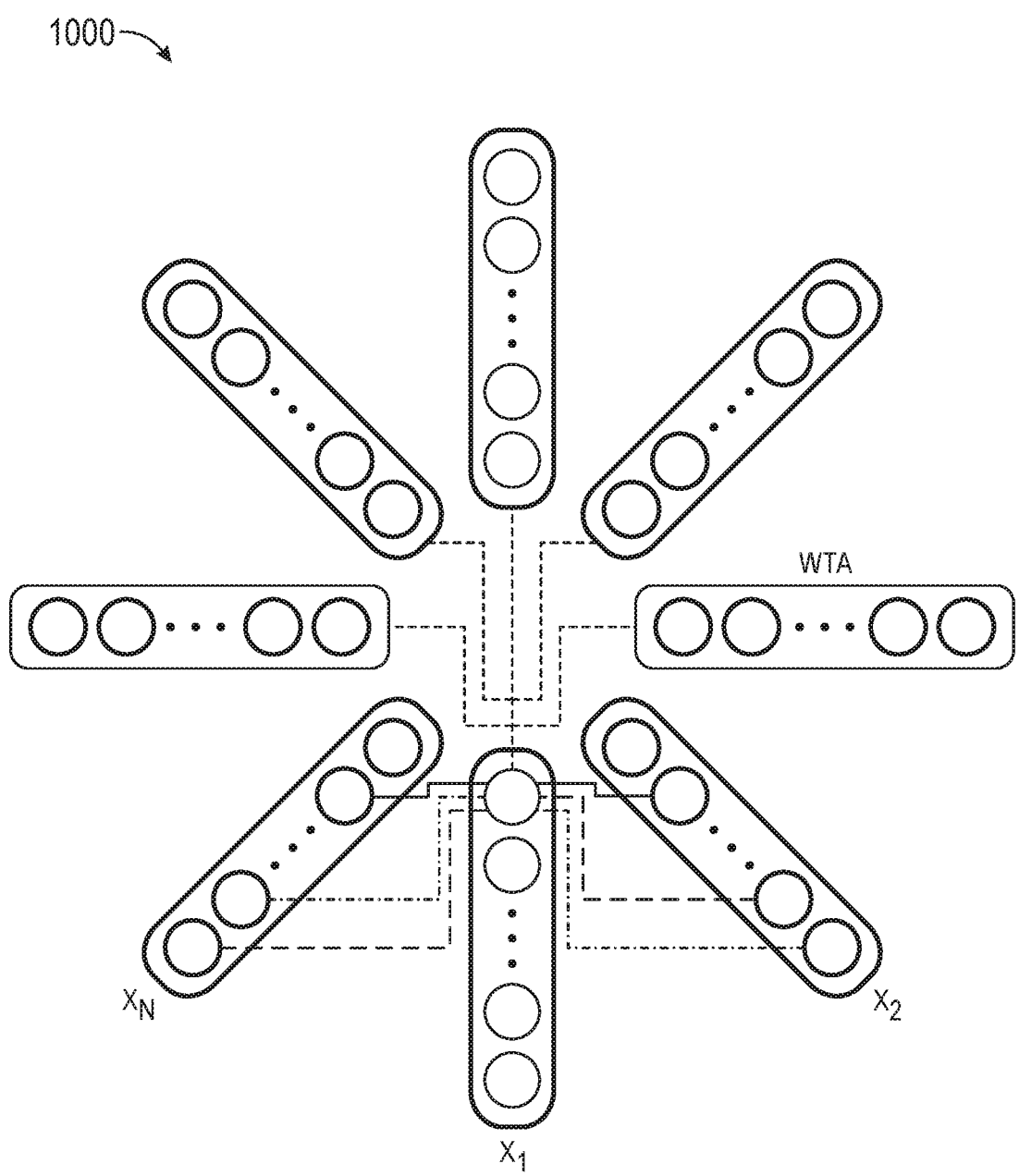
FIG. 10 is an illustrative pictorial drawing representing a redundant Winner-Take-All (WTA) sub-network in a stochastic spiking neural network (SNN) solving constraint satisfaction, according to an example.

FIG. 10 is an illustrative pictorial drawing representing a redundant WTA sub-network in a stochastic SNN solving constraint satisfaction 1000. Each $X_i$ population may share a single set of WTA weights using a population connectivity feature of a neuromorphic architecture in accordance with some embodiments.

Figure 11:
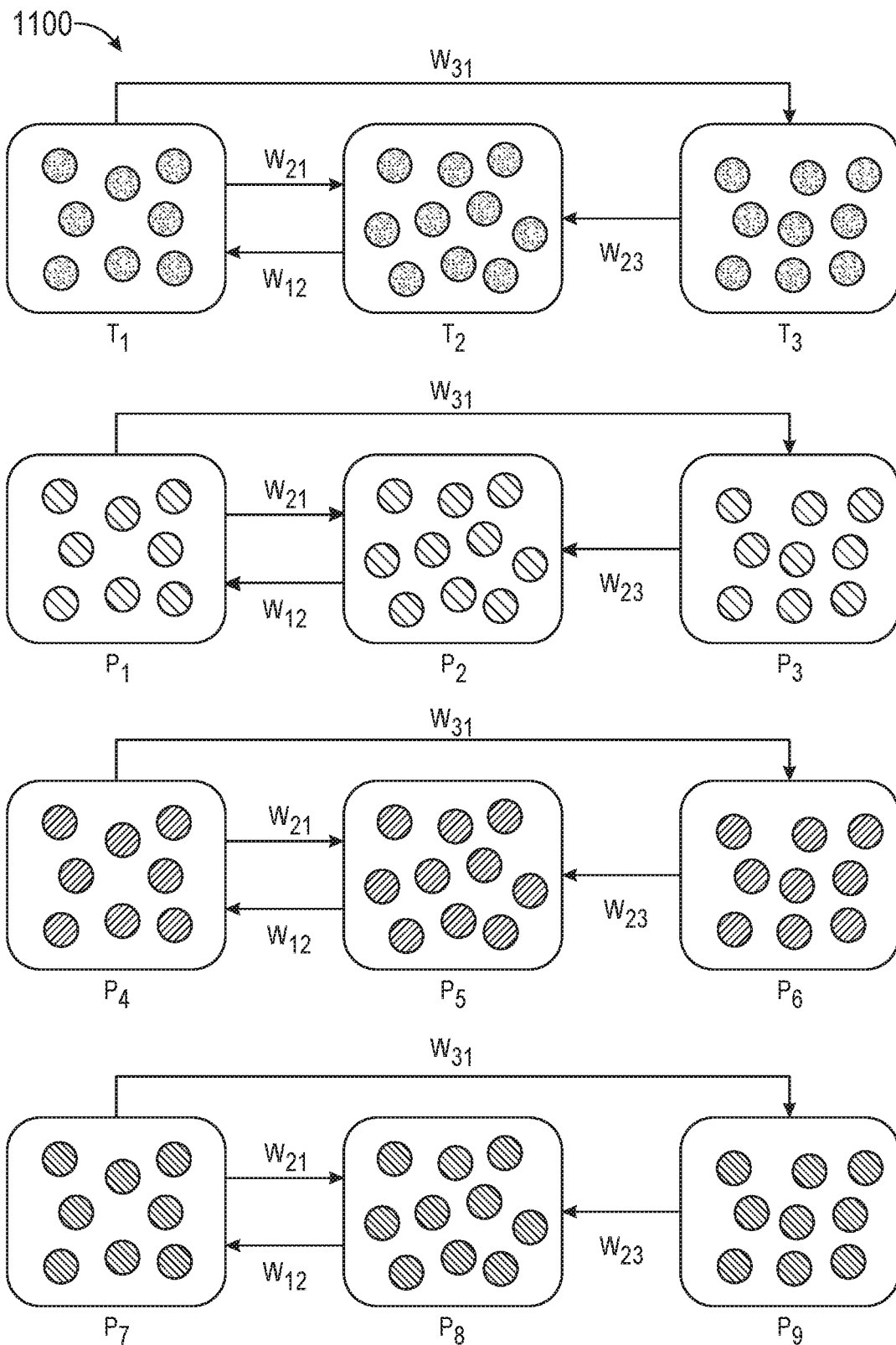
FIG. 11 is an illustrative pictorial drawing showing an example population connectivity model, according to an example.

FIG. 11 is an illustrative pictorial drawing showing an example population connectivity model 1100. Connectivity state $w_{ij}$ specifies a template network between population types ($T_i$, Tj). Connectivity may be bound to any number of specific neuron populations of the corresponding types. The $w_{ij}$ state needs only be stored once per network type, rather than redundantly for each network instance.

More particularly, the network template is specified in terms of three neuron population types ($T_1$, $T_2$, and $T_3$) with four connection matrices ($w_{31}$, $w_{12}$, $w_{21}$, and $w_{23}$). Each connection matrix $w_{ij}$ specifies the connectivity state (typically a weight and delay pair) between all neurons in a population type j connecting to all neurons in the destination population type i. Hence each $w_{ij}$ matrix specifies $|T_i| \times |T_j|$ connections where $|T_i|$ indicates the number of neurons in a population type Ti. Thus, in the example shown in FIG. 11, the four connection matrices ($w_{31}$, $w_{12}$, $w_{21}$, and $w_{23}$) are used to connect neurons of neuron populations ($P_1$, $P_2$, $P_3$), to connect neurons of neuron populations ($P_4$, $P_5$, $P_6$), and to connect neurons of neuron populations ($P_7$, $P_8$, $P_9$).

For clarity of terminology, neurons that belong to populations are referred to as atoms. An atom is understood to belong to a parent neuron population of some associated type.

The neuromorphic architecture allows this template to be applied to any number of specific neuron populations $P_i^T$ in a core that each belong to the types T in the network connectivity template. Given N such sets of population instances, this feature provides a factor of N savings in synaptic connectivity state compared to the baseline architecture. For a fixed amount of synaptic configuration resources (SYNAPSE_CFG memory size), the savings may be spent on increasing neuron fan-in and fan-out factors by a factor of N.

Figure 12:
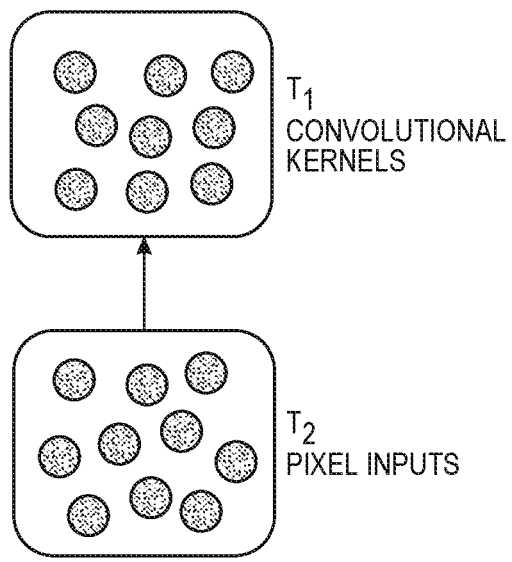
FIG. 12 is an illustrative pictorial drawing showing an example population connectivity template for a simple one-layer Convolutional Neural Network, according to an example.

FIG. 12 is an illustrative pictorial drawing showing an example population connectivity template for a simple one-layer Convolutional Neural Network. A typical conventional Convolutional Neural Network may be specified very simply using the population connectivity model. In fact, a ConvNet corresponds to the trivial case of one population connected to a second population by a single feed-forward weight matrix, shown in FIG. 12. The weight matrix specifies a receptive field and a set of kernels. Atoms of the first population correspond to pixels within a patch from an input image. Atoms of the second population represent features that activate according to their receptive field and input patch.

In general, SNNs have much richer structures than the ConvNet case due to their use of recurrence. Therefore, SNNs generally use a more general hierarchical connectivity model to achieve good connectivity compression. This feature satisfies that need.

Figure 13A:
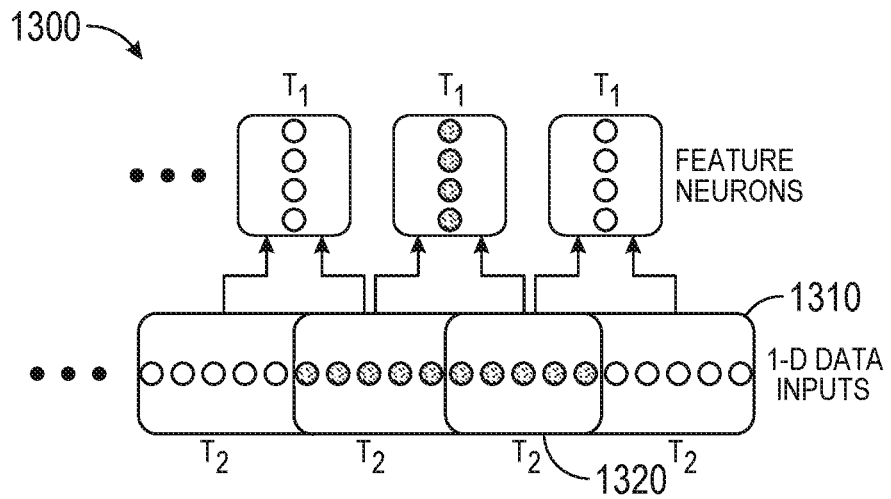
FIG. 13A is an illustrative pictorial drawing showing a one dimensional overlapping window example network, according to an example.
Figure 13B:
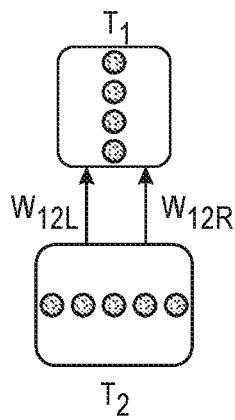
FIG. 13B is an illustrative pictorial drawing showing overlapping interactions compressed with multi-path population arcs, according to an example.
Figure 13C:
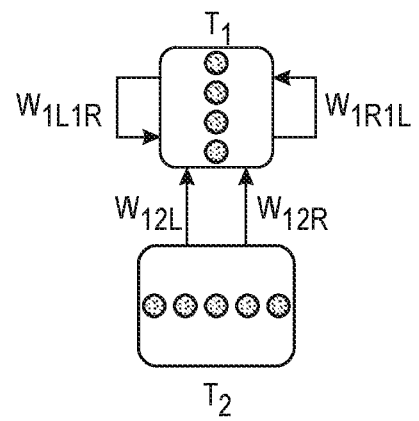
FIG. 13C is an illustrative pictorial drawing showing additional recurrent arcs coupling all atoms across all feature populations to implement complex competitive SNN dynamics, according to an example.

FIG. 13A is an illustrative pictorial drawing showing a one dimensional overlapping window example network. FIG. 13B is an illustrative pictorial drawing showing overlapping interactions may be compressed with multi-path population arcs. FIG. 13C is an illustrative pictorial drawing showing additional recurrent arcs coupling all atoms across all feature populations to implement complex competitive SNN dynamics.

The connectivity model as described above is oversimplified in one respect: it provides no way to specify different connections between multiple population instances of the same types. Such cases arise in the context of patch- or window-based computations (including ConvNets) when the patches are constructed to overlap. FIG. 13A shows such an example 1300. For ease of illustration, a one-dimensional example is shown, although the population structure shown generalizes to any higher dimensional patch-based network.

An input signal (e.g., audio) 1310 is processed in parallel by populations of feature-matching neurons that operate on sliding windows 1320 that advance and overlap on half-window increments.

To support such networks, the population connectivity is defined in terms of "FIP" identifiers, representing a specific fanin arc to a particular destination population, in type space, as well as the specific destination population instance of the population type, or "(Fan In, Population)" pair. The "FI" component is common over all source and destination neurons belonging to the same population types, while the "P" component identifies a specific population instance that is common over all neurons belonging to the same destination population. A given population may have multiple fanin arcs from the same source population, distinguished by different FI cases. This generalizes the last section's "ij" subscript identifiers of the wij matrices. For example, in FIG. 13B, the two FIPs in the network template are (2L, 1) and (2R, 1).

The power of this feature becomes apparent when one considers recurrence. When the atoms of a particular population type interact as a result of recurrence through different fan-in arcs, it is possible to construct networks that couple any number of population instances together. Rather than operating as N independent neural networks, the atoms may now interact across all populations as one very large flat network, giving rise to complex high-dimensional dynamic behavior. Very little extra connectivity configuration is needed to specify such a complex network compared to the simple non-interacting case (see FIG. 13C).

The population connectivity feature adds little implementation cost to the baseline neuromorphic architecture. One change is the expansion of the spike message payload to carry a source population atom number, in addition to the AxonID mapping index of the baseline architecture, which in this section will be referred to as a fip_idx. These new population spike messages engage special index calculation rules in Dendrite that derive a list of synaptic connections based on both the AxonID (fip_idx) lookup through SYN-APSE_MAP as well as an additional level of indexing as a function of the source atom number.

Figure 14:
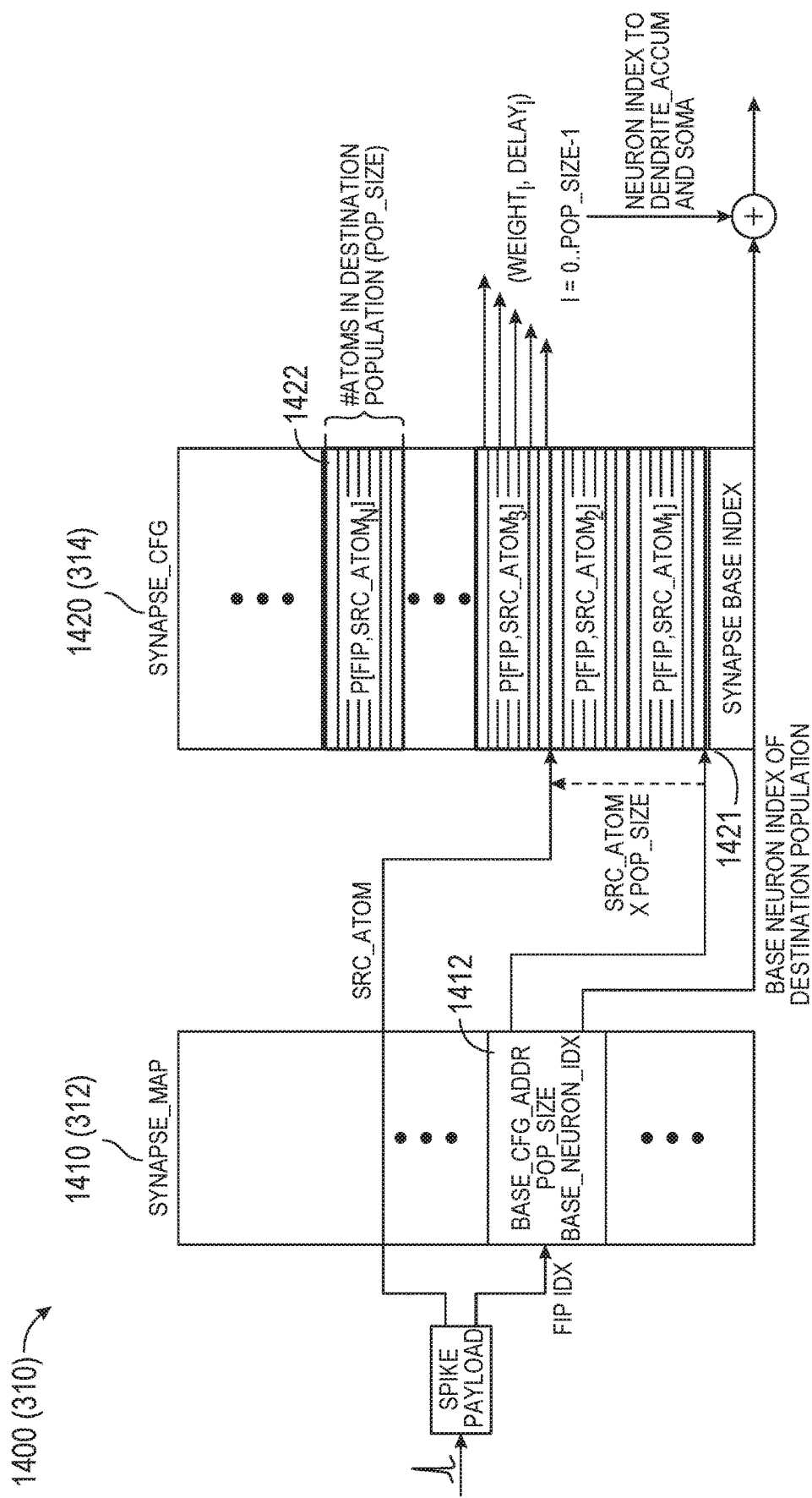
FIG. 14 is an illustrative flow diagram representing population spike index mapping flow in a dendrite logic circuit, according to an example.
Figure 15:
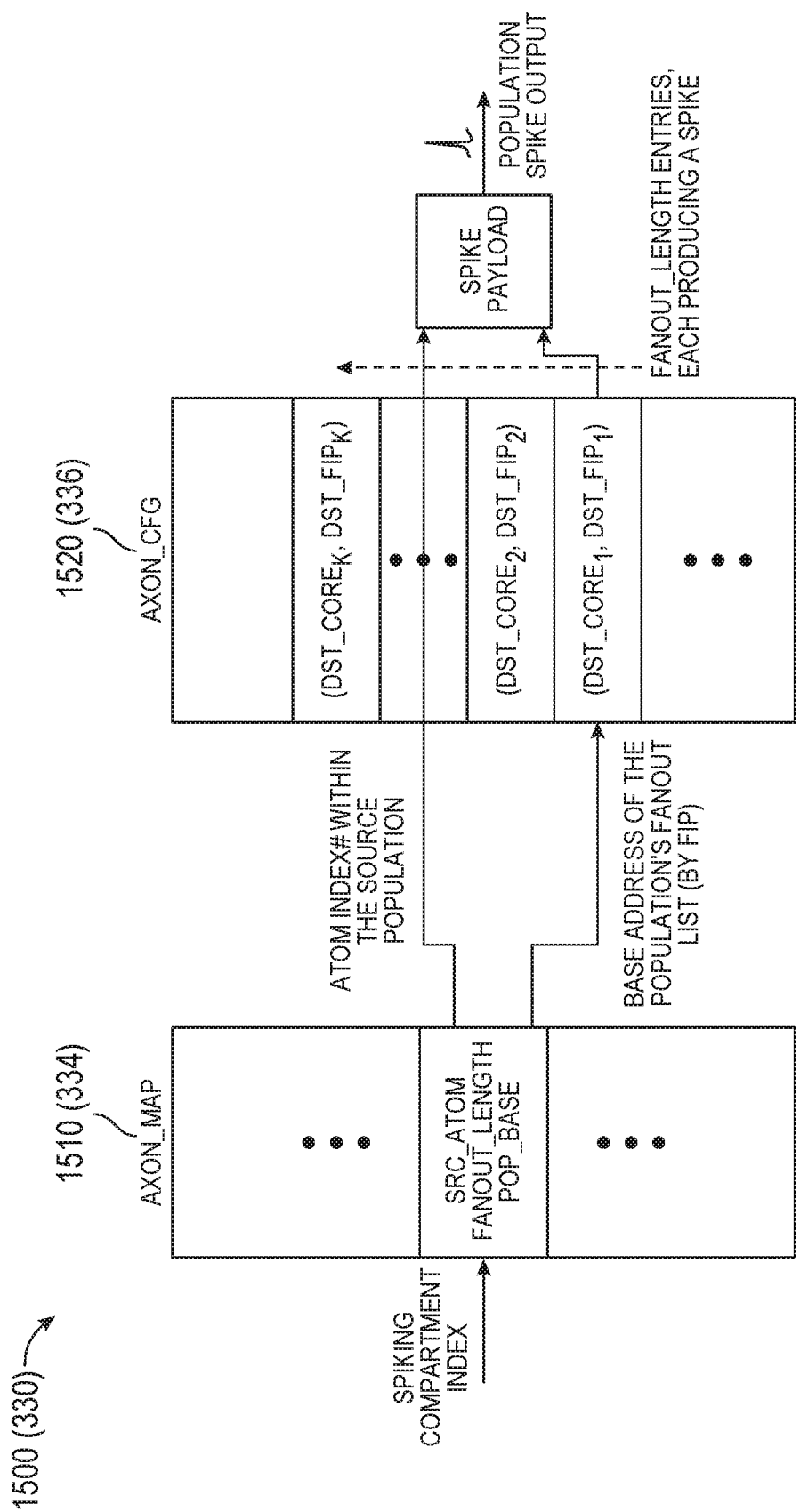
FIG. 15 is an illustrative flow diagram representing population spike generation mapping flow in a soma logic circuit, according to an example.

FIG. 14 is an illustrative flow diagram representing population spike index mapping flow in a dendrite logic circuit 1400 (310), with the organization of destination population synapses in the SYNAPSE_CFG memory 314. The synaptic lists in SYNAPSE_CFG 1420 (314) are organized by blocks 1422 of M length-N synaptic lists, where M is the size of the source population type and N is the size of the destination population type (pop_size in FIG. 14). The base address of the type-space connectivity structure $\mathcal{P}$ is indexed from the SYNAPSE_MAP 1410 (312) entry as for the baseline case. The particular sub-list corresponding to the spike's source atom is further dereferenced by multiplying the source atom number from the spike payload by N. Further, to map the type-space synaptic entry offsets to the neuron indices of the specific destination neuron population, the sequential offsets 0 . . . N−1 are added to the base index of the destination neuron population. Technically speaking, these are dendritic compartment indices. This population-mapped compartment index is then used downstream by DENDRITE_ACCUM 316 and SOMA 330 as in the baseline architecture.

The functionality above serves to eliminate redundancies in the SYNAPSE_CFG memory 1420 by allowing all population pairs of the appropriate types to reference the single, shared population connectivity structure $\mathcal{P}$. Two different fanin-population pairs, identified by two unique $fip_1$ and $fip_2$ identifiers, would each map their own SYNAPSE_MAP 1410 entry. The two entries would share the same base_cfg_addr and pop_size parameters 1412, thereby pointing to the same $\mathcal{P}$ region of SYNAPSE_CFG 1420, while specifying two different base_neuron_idx values specific to each fip's associated destination population instance.

The population mapping capability comes at a modest increase in hardware resource requirements and design complexity. The SYNAPSE_MAP 1410 and AXON_MAP 1510 have an incremental increase in size compared to the baseline architecture (8-12 additional bits per entry). In some embodiments, the extra index arithmetic logic in the dendrite consists of a 12-bit multiplier and adder. The SYNAPSE_CFG 1420 entries no longer need to explicitly identify a destination dendrite index, so in this mode, bits are freed to allow for a higher synapse count per entry, which is an additional incidental benefit.

The population mapping capability comes at a modest increase in hardware resource requirements and design complexity. The SYNAPSE_MAP 1410 and AXON_MAP 1510 have an incremental increase in size compared to the baseline architecture (8-12 additional bits per entry). In some embodiments, the extra index arithmetic logic in dendrite consists of a 12-bit multiplier and adder. The SYNAPSE_CFG 1420 entries no longer need to explicitly identify a destination dendrite index, so in this mode, bits are freed to allow for a higher synapse count per entry, which is an additional incidental benefit.

The population connectivity model may significantly reduce the resource requirements for mapping certain SNNs to the neuromorphic hardware in accordance with some embodiments. Compared to a flat network representation, the population connectivity model allows the tables to represent the connectivity information hierarchically. Table 1 below quantifies these savings for a simple canonical network consisting of P populations, each containing N atoms, with the atoms of each population connecting to the atoms of k other populations. For such a network, the weights and delays per synapse stored in SYNAPSE_CFG 1420 are reduced by a factor of P with population-based connectivity. The SYNAPSE_CFG memory 1420 is a resource-constrained memory in the architecture. Increasing its capacity may make the difference in scaling an SNN algorithm to the point that it outperforms conventional CPU-based algorithms.

As a specific example, consider the problem of sparse feature coding a 144×144 pixel image with 12×12 overlapping patches (with half-patch overlaps) using the spiking-LCA algorithm and a 200-atom dictionary. In this case, P is 265, k is 9, and N is 200. With these parameters, a single patch of feature neurons uses $kN^2=360,000$ synapses to represent all fan-in connections. For all but single-bit weights, this might exceed the SYNAPSE_CFG 1420 capacity of a single core, necessitating "slicing" the patches into sub-populations. This may reduce N to 50 at the expense of increasing k to 36. Such a synaptic table with 4-5 b weights would now fit into a single core. With the population connectivity model, a neuromorphic core provisioned for 1024 neurons could then support 20 populations per core. In contrast, with a flat connectivity model, the core's synaptic resources would be entirely consumed by the fan-in state of a single neuron population, and the rest of the core's neuron resources would remain unusable.

For this practical example, using population connectivity, a neuromorphic integrated circuit chip may support 20 times more neurons than without the feature, meaning it may sparse code 20 times larger images with the same silicon area. Far more important than the increase in image size is the savings this provides in time and energy to obtain the sparse coding solution. The best CPU-based LASSO sparse coding solvers scale quite poorly in the total number of unknowns. For example, some of the best solvers use $O(m^3)$ FLOPS to solve a problem with m unknowns, given a constant sparseness factor, where in this case m=P·N, On the other hand, energy of the SNN solution may scale as $O(m^a)$, where a is conservatively bounded above by 1.5. A similar relation holds for the time-to-solution. Hence a 20 times larger image size gives the neuromorphic chip an approximate advantage in energy-delay-product of $20^{1.5} \cdot 20^{1.5} = 8000 \times$ compared to the CPU solver.

To summarize, in the case of LASSO sparse coding, the population connectivity feature increases the problem scale such that the neuromorphic solution offers orders of magnitude improvement over a traditional CPU-based solver. Network scale is important to exploit the neuromorphic architecture's fine-grain parallelism while overcoming its disadvantages in precision.

TABLE 1

Comparison of resource needs for baseline and population connectivity models

| Memory | | Baseline requirement (best case) | Population connectivity requirement |
|---|---|---|---|
| SYNAPSE_MAP, AXON_CFG | One entry per population fan-in arc of each population instance (FIP) | P · N | k · N |
| SYNAPSE_CFG | One entry per fan-in weight of each atom per population type | P · k · N² | k · N² |
| DENDRITE_ACCUM, SOMA_CFG, SOMA_STATE, AXON_MAP | One entry per neuron/compartment (no change) | P · N | P · N |

The paragraphs that follow provide a register-level description of one possible embodiment of the architecture described above.

TABLE 2

NEURON_GROUPS Register

| 31:10 | 9:0 |
|---|---|
| RSVD | NumGroups |

The NumGroups configuration parameter controls the number of configured neurons in the core. The core may service neuron state on every time step in order from 0 to 4*NumGroups−1. The value may be changed during the idle phase of barrier synchronization when all cores are halted.

TABLE 3

TIME Register

| 31:4 | 3:0 |
|---|---|
| RSVD | Time |

The TIME register tracks the current 4-bit time of the core. On every barrier synchronization step, the hardware increments the value modulo 16. The DENDRITE process may use this state to manage its DENDRITE_ACCUM 316 spike accumulation schedule. Writes to this register may be supported for hardware debug purposes.

FIG. 16 is a register definition of SYNAPSE_MAP[0 . . . 2047] 1600 (1410). The SYNAPSE_MAP table 1600 maps each input spike received by the core to a list of synaptic entries in SYNAPSE_CFG 1420. Its specific behavior depends on whether the input spike is a discrete (standard) spike containing just an AxonID or a population spike containing both FIP (AxonID) and SRC_ATOM identifiers. In the case of discrete spikes, the SYNAPSE_MAP 1410 index is taken from the bottom 11 bits of the received 16-bit SPIKE_ID. The entry primarily returns a (CFG_BASE, CFG_LEN) pair that identifies a list of synapses in SYNAPSE_CFG 1420, beginning at SYNAPSE_CFG[CFG_BASE], ending at SYNAPSE_CFG[CFG_BASE+CFG_LEN−1].

In the case of population spikes, the SYNAPSE_MAP 1420 index is taken from the top 11 bits of SPIKE_ID, skipping the first five bits that always encode the lowest five bits of SRC_ATOM. In addition to returning a (CFG_BASE, CFG_LEN) pair as for discrete spikes, the SYNAPSE_MAP 1410 entry also specifies ATOM_BITS, which determines the size of the source population type, specifically the number of SRC_ATOM bits extracted from SPIKE_ID:

$src\_atom = SPIKE\_ID\ \&\ (0x1FF >> (4-ATOM\_BITS))$

The extracted SRC_ATOM value is used to select the appropriate source atom synaptic weight sub-list from SYNAPSE_CFG according to the following formula:

$idx = CFG\_BASE + src\_atom * CFG\_LEN$

The source atom's synaptic weight list spans the range SYNAPSE_CFG[idx] to SYNAPSE_CFG[idx+CFG_LEN−1].

For population spikes with ATOM_BITS>0, this may lead to aliasing of entries in the table due to the unconditional inclusion of SRC_ATOM_HI in the 11-bit index. Software may configure all aliased entries identically. For both spike types, the NGROUP_BASE value is used at the output of SYNAPSE_CFG 1420 to map the synaptic weight values to the appropriate neuron (dendrite compartment), as described below.

1. CFG_BASE: Specifies the first SYNAPSE_CFG address of the spike's synaptic fanout list.
2. CFG_LEN: Specifies the length of the spike's synaptic fanout list (per source atom, in the case of population spikes.)
3. NGROUP_BASE: Specifies the base neuron (compartment) group index to which all dendrite offset values from SYNAPSE_CFG are added to obtain specific destination neuron (compartment) indices.
4. ATOM_BITS: Encodes the width of the source atom field in SPIKE_ID. Values greater than 4 are illegal and will cause undefined behavior.

FIG. 17 is a memory map of SYNAPSE_CFG[0 . . . 8191] 1700 (1420), which is a heavily overloaded register that specifies the weights and delays of synaptic connections in the core. In one example architecture, the address space is organized in units of 32-bit words, with address offset idx returning the low or high 32 bits of SYNAPSE_CFG[idx/2]. In FIG. 17, the single starred entry indicates that the box synapse may be supported in another architecture, and the double starred entry indicates that the other architecture entry type 5 generalizes the first architecture's entry 5 to prefer either weight or delay precision based on the configured value in the 'T' field (bit 12).

Each entry encodes a number of synapses between 4 and 48, depending on the entry type. A total of nine entry types are defined in the example architecture shown. These are primarily specified by the lowest three bits in the entry (2:0), but in the case of Type 5, the bit field encodings may also be dependent on bit 12 (T).

For a given input spike, a list of neuron (compartment) fanouts within the core are specified by a sequential list of SYNAPSE_CFG 1420 entries. The starting address and length of the list are derived from the SYNAPSE_MAP 1410 lookup as described above. All entries in a spike's fanout list need not have the same encoding type.

Each synapse from the SYNAPSE_CFG entry maps to a (Weight$_i$, Delay$_i$) pair, where Weight$_i$ is a signed six bit quantity and Delay$_i$ specifies a four bit delay value over the range 1 . . . 15. Each entry maps its synapse values in a unique way. For types 0, 1, 2, 4, 7: Weight$_i$=(−1)(1−S)*W$_i$. For type 3: Weight$_i$=(−1)(1−S)*choose(W$_i$==1, WGT, 0). For type 6: Weight$_i$=W$_i$. For types 1 and 5: Delay$_i$=1+DLY+D$_i$. For types 0: Delay$_i$=1+D$_i$. For types 2, 3, 6, 7: Delay$_i$=1.

Type 5 allocates either four or three bits of weight (plus a shared sign bit) and three or four bits to Delay, respectively, dependent on the value of bit 12 (T):

$T=0$: Weight$_i$=(−1)(1−S)*(HI$_i$*8+W$_i$) Delay$_i$=1+B+D$_i$ $T=1$: Weight$_i$=(−1)(1−S)*(B+W$_i$) Delay$_i$=1+HI$_i$*8+D$_i$ Referring to FIG. 18, which is a graph 1800 illustrating a box synapse (Type 4), the special Box synapse type (type 4) is unique in that it generates two synaptic events at different times. The two events target the same destination compartment, but have oppositely-signed weights and different times. Effectively, the first event turns on an inflow of current into the compartment and the second event turns the current off. These have sometimes been described as modeling NMDA plateau synapses. One interpretation is that they encode a conductance-saturating exponential weight scale with a linear box width. The box width is specified by the synapse entry's Di parameter. The onset and disable events are generated as follows:

Box Onset Event: OnWeight$_i$=(−1)$^{(1-s)}$*W$_i$

OnDelay$i$=1

Box Disable Event: OffWeight$_i$=(−1)$^5$*W$_i$

OffDelay$_i$=1+D$_i$

For each synapse of a SYNAPSE_CFG entry, a dendritic compartment index is calculated as follows:

For type 0: dend_$idx$=NGROUP_BASE*4+DEN$_i$*4+i

For all others: dend_$idx$=NGROUP_BASE*4+DEN*4+i

For the discrete spikes, the dendrite indices are implied directly from the SYNAPSE_CFG entry and the value of NGROUP_BASE from SYNAPSE_MAP. For population entries, DEN is 0. Over successive SYNAPSE_CFG entries in a population list, NGROUP_BASE advances by ceil (num_synapses/4), where num_synapses is 8, 12, and 15 for entry types 5, 6, and 7 respectively. NGROUP_BASE advances over successive SYNAPSE_CFG entries when handling population spikes.

TABLE 4

| DENDRITE_ACCUM[0 ... 16383] | | | | | | | | | | | | | | | | |
|---|---|---|---|---|---|---|---|---|---|---|---|---|---|---|---|---|
| 31:16 | 15 | 14 | 13 | 12 | 11 | 10 | 9 | 8 | 7 | 6 | 5 | 4 | 3 | 2 | 1 | 0 |
| RSVD | WeightSum | | | | | | | | | | | | | | | |

In Table 4, DENDRITE_ACCUM 316 exposes the dendritic spike accumulation state. Each neuron (compartment) has sixteen counters, one per future time step. As spikes are received and mapped to a list of (i, Weight$_i$, Delay$_i$) synaptic events, each Weight is added to the appropriate WeightSum counter. The DENDRITE_ACCUM 316 index is calculated as follows:

$$idx = i*16+(Time+Delay_i)\% 16$$

Time is the core's current time step, a value between 0 and 15. As neurons (compartments) are serviced for the current time step, the DENDRITE_ACCUM[n*16+Time] WeightSum values are read sequentially over n=0 ... 1023 and passed to SOMA for handling. The DENDRITE_ACCUM [n*16+Time] WeightSum is then reset to 0 so it is ready to accumulate future spikes arriving for time step Time+16.

Figures 18, 19, 20:
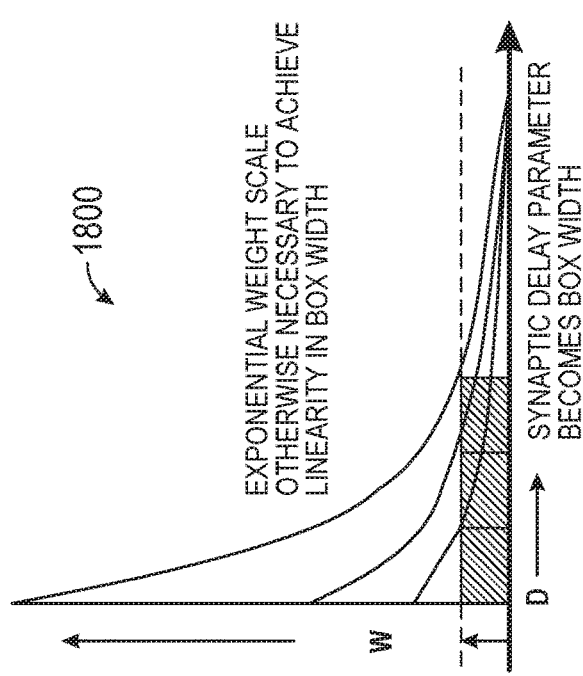
FIG. 18 is a graph illustrating a box synapse (Type 4), according to an example.
FIG. 19 is a memory map illustrating SOMA_CSTATE, according to an example.
FIG. 20 is a memory map illustrating SOMA_CFG, according to an example.

FIG. 19 is a memory map illustrating SOMA_CSTATE[0 ... 255] 1900. The ReuseLast$_i$ bits from SOMA_CSTATE[idx] configure the mapping of compartment number idx*4+i to SOMA_CFG entry. If ReuseLast$_1$ is set to 1, then compartment idx*4+i will use the same configuration values as compartment idx*4+i-1. Since SOMA_CFG only has 512 entries, the second target core variation only supports 512 unique compartment configurations, and in order to support N>512 neurons, at least N-512 of those neurons must share their SOMA_CFG configuration with others. For idx 0, ReuseLast$_0$ is interpreted as 0 regardless of its configured value.

The 3-bit CState$_i$ is used by the hardware for compartment activity gating and state machine sequencing purposes. It is exposed to SW in this register mainly for debugging purposes. Writes to CState during operation may cause highly unpredictable behavior. Seven states are defined:
 0: INACTIVE
 1: INHIBITED
 2: IDLE
 3: REFRACT
 4: FIRING
 5: STALLED
 6: IREFRACT
 7: (unused)

In the INACTIVE and INHIBITED states, the compartment's state should not be further updated on the time step unless non-zero synaptic input has arrived for the compartment. In the case of the INHIBITED state, the total synaptic input must be positive. The IDLE, REFRACT, and FIRING states are the typical states that a neuron cycles through as it updates its membrane potential V state in response to synaptic input (IDLE), fires and enters its refractory state (REFRACT), and delays the release of its spike output beyond its refractory period (FIRING). If a neuron's AxonDelay is less than or equal to RefractDelay (i.e. axon delay is less than the refractory period), then the FIRING state will never be exercised.

In the embodiment described, for efficiency, the neuron model implements axonal delay with a single counter state variable at the source neuron core, and as such it can only produce a maximum of one spike output per AxonDelay period. (Additional synapse-specific delay may be added at the fanout core(s) that is not subject to this restriction.) This limitation introduces a potential corner case handled by the STALLED state: while in the FIRING state (the case of AxonDelay>RefractDelay), if the neuron's V exceeds Threshold for a second time before the prior spike's AxonDelay period has been reached, then the neuron enters the STALLED state. In this state, V is held constant at its above-threshold value until the prior spike is released.

The IREFRACT state is a variation of the REFRACT state induced not by the compartment firing, but by an overload of inhibitory input. When the global RefractInhibited parameter in SOMA_SHARED_CFG (FIG. 23) is set to 1, compartments will enter a refractory state when V exceeds the lower V bound set by NegVmLimit. In conjunction with stochastic refractory delay, this feature helps implement certain stochastic spiking neural network models of computation.

FIG. 20 is a register definition illustrating SOMA_CFG[0 ... 511] 2000 (332a). The 10-bit OpCode value specifies the operational behavior of the compartment in terms of five parameters, illustrated in FIG. 21, which is a memory map 2100 illustrating the OpCode.

Figures 22, 23:
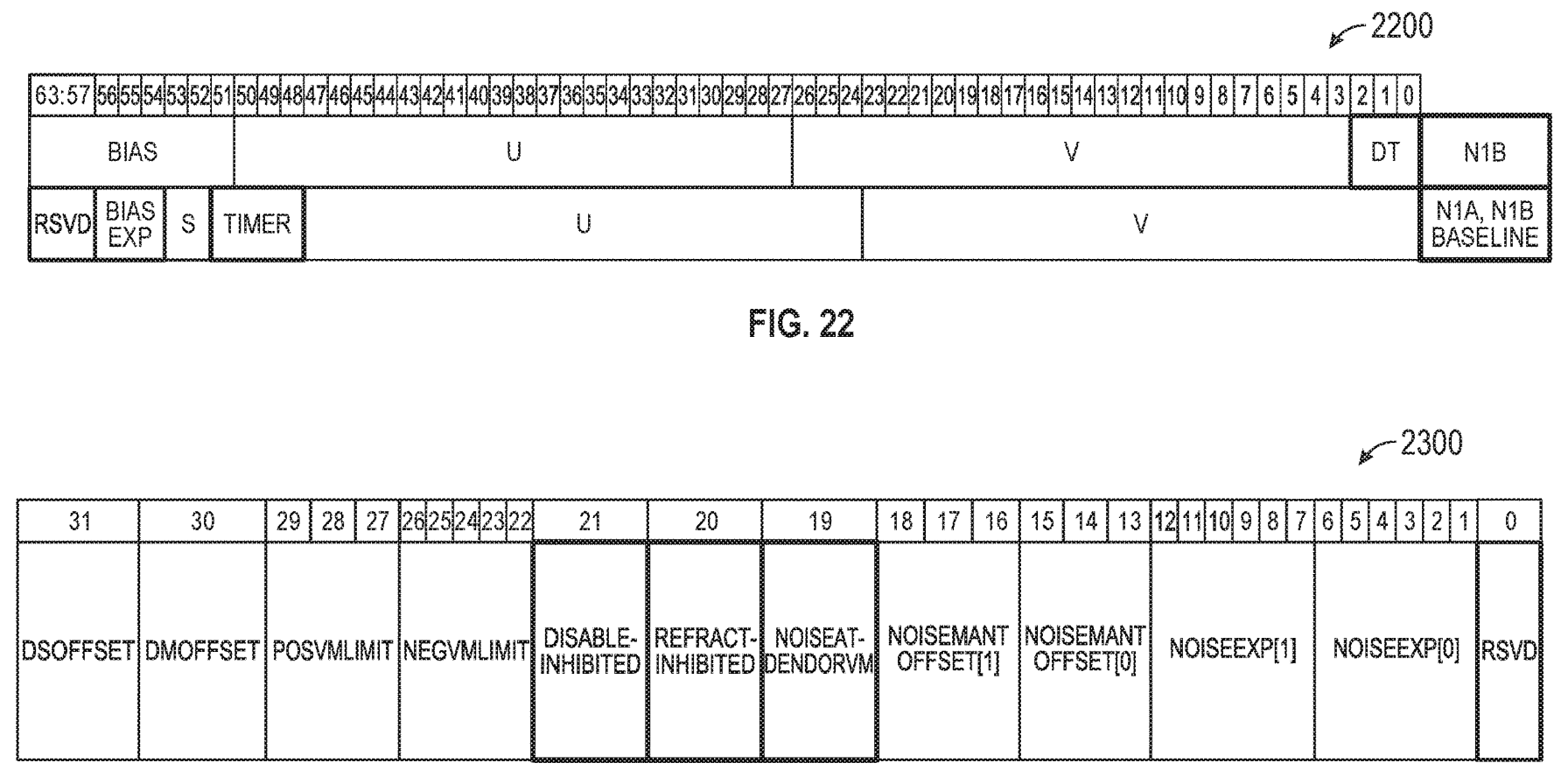

FIG. 22 is a memory map illustrating that the SOMA_STATE[0 ... 1023] memory 2200 maintains a state unique to each compartment in the core that is updated on every time step. The 24-bit U and V variables consume the majority of this state, corresponding to the compartment's dendritic current and membrane potential respectively. Additionally, the timer state associated with the neuron's refractory time and axon delay are maintained in this register.

In an implementation of the cores, a two-bit State (S) field encodes the phase of the neuron's operation as it proceeds from synaptic integration to firing to refractory period:
 0: IDLE
 1: REFRACT
 2: FIRING
 3: STALLED This state information resides in the SOMA_CSTATE memory. Bits 10:3 of the SOMA_STATE entry (V[7:0]) are overloaded to provide eight bits of refractory timer state while the compartment is in its REFRACT state. The three-bit DT field counts any additional time steps needed in order to implement the neuron's AxonDelay once the neuron transitions from REFRACT to FIRING. This imposes the constraint that AxonDelay−RefractDelay<8.

As a result of memory design optimizations, some portion of the neuron static configuration parameters is stored in SOMA_STATE. Specifically, the thirteen bit Bias mantissa is maintained in SOMA_STATE and must be initialized to the appropriate value by management software. All other fields should be written as 0 when configuring these bias settings out of reset, or should be read and re-written as-is if the bias values are ever changed during operation.

The Bias mantissa is the only compartment configuration parameter that may be uniquely assigned per compartment. Due to the reduction in SOMA_CFG size, all other configuration settings must be shared between multiple compartments in order to utilize more than 512 compartments in a core. Since Bias is typically used to encode an input activation level that is specific to each neuron, the assignment of Bias to SOMA_STATE maximizes the second core's resource utilization efficiency versus the assignment of any other SOMA_CFG parameter.

FIG. 23 is a register definition illustrating the SOMA_SHARED_CFG parameter 2300 in the second core variant that specifies a variety of miscellaneous model configuration parameters that are shared across all compartments in the core. These fall into three categories:

DsOffset, DmOffset: Small numerical tweaks to the synaptic current and membrane voltage dynamics to enable perfect 1st order dynamics (i.e., 0 synaptic decay time constant) or perfect integrate-and-fire dynamics (i.e., infinite membrane decay time constant).

PosVmLimit, NegVmLimit, DisableInhibited, RefractInhibited: Bound the positive and negative range of the V membrane potential and control a compartment's behavior when it triggers the negative bound.

NoiseAtDendOrVm, NoiseMantOffset, NoiseExp: Configure the core's two pseudorandom number generators.

FIG. 24 is a register definition illustrating the AXON_MAP[0 . . . 1023] 2400 (1510). When a neuron fires, its compartment index is mapped through AXON_MAP 2400 to obtain a base address (AxonCfgBase) and length of output spike entries (AxonCfgLen) in AXON_CFG 1520.

Additionally, if the AXON_CFG 2500 (1520) list includes population spike entries, then the mapping of compartment index to source atom number within the source population is performed by the AXON_MAP 2400 lookup, via the SrcAtom field.

FIG. 25 is a memory map illustrating AXON_CFG[0 . . . 2047] 2500 (1520). The entries in AXON_CFG 2500 generate the core's spike output messages. The contents of bits 29:0 are mapped directly, with minimal modification, into the outgoing messages. In most cases, there is a one-to-one correspondence between each AXON_CFG 2500 address and a spike message. The one exception is the Remote Spike entry, which requires two AXON_CFG entries per message. In that case, the first AXON_CFG entry specifies the first 32 b of the remote spike message, and the next sequential AXON_CFG entry specifies the remote spike payload, which must be either a discrete or population type entry.

The MeshDst field identifies the 14-bit mesh destination address for the outgoing spike messages. The rest of the AXON_CFG 2500 entry determines the spike payload value. The 16-bit SpikeID payload is generated by a simple rule:

$$SpikeID=Entry[29:14]|SrcAtom$$

where Entry is the AXON_CFG 2500 entry and SrcAtom is the value mapped by AXON_MAP 2400.

Barrier events are shown in the register encoding above only to illustrate that these special message types will be generated by AXON_CFG 2500 if so configured. However, normally the core's barrier synchronization state machine will automatically generate these messages in order to advance the core from time step to time step in coordination with all other cores in the system. Management software should avoid configuring barrier events in AXON_CFG.

Figure 26:
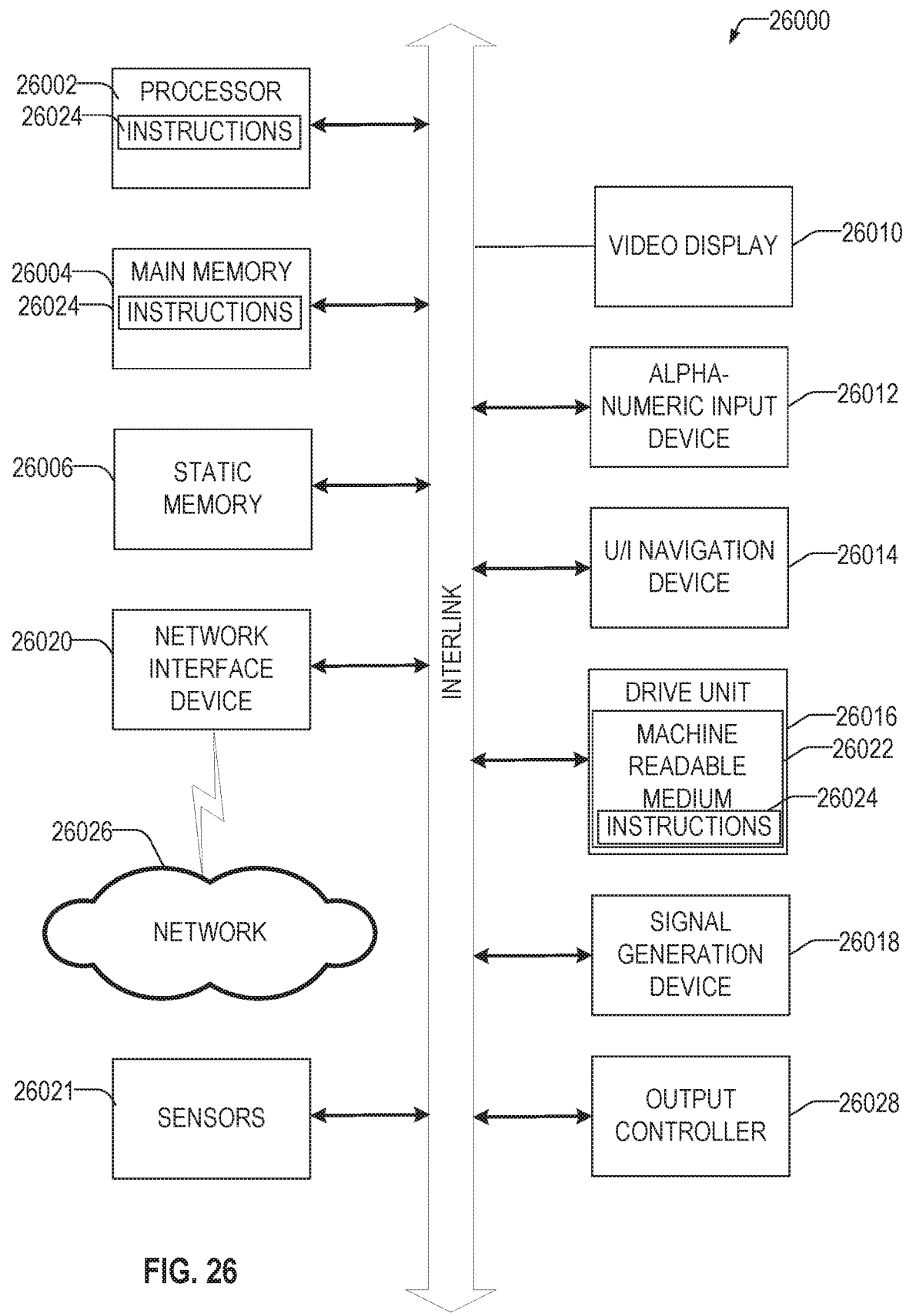
FIG. 26 is a block diagram illustrating a machine or system within which a neuromorphic core may be used, according to an example.

The M field distinguishes remote spikes from local spikes and controls how the spike messages are sent to the mesh. For a system with a routing network comprising two physical meshes, referred to as P and Q, the 2-bit M field specifies one of the four cases:

00—Round-robin alternation between Q and P meshes, beginning with Q.
01—Remote spike; will always be routed to the Q mesh
10—Send to the P mesh
11—Send to the Q mesh FIG. 26 is a block diagram illustrating an example of a machine 26000 upon which one or more of the techniques (e.g., methodologies) discussed herein may be performed. In alternative embodiments, the machine 26000 may operate as a standalone device or may be connected (e.g., networked) to other machines. In a networked deployment, the machine 26000 may operate in the capacity of a server machine, a client machine, or both in server-client network environments. In an example of a machine described herein, the machine 26000 may act as a peer machine in a peer-to-peer (P2P) (or other distributed) network environment. The machine 26000 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 26000 may function as a computing device executing an application, Key Manager, Key Keeper, or the like. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules may include tangible entities (e.g., hardware) capable of performing specified operations and may be configured or arranged in a certain manner. In an example, circuits may be arranged (e.g., internally or with respect to external entities such as other circuits) in a specified manner as a module. In an example as described herein, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example as described herein, the software, when executed by the underlying hardware of the module, causes the hardware to perform the specified operations.

Accordingly, the term "module" is understood to encompass a tangible entity, and that entity may be one that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 26000 may include a neuromorphic processor 110, 300, a hardware processor 26002 (e.g., a central processing, unit (CPU), a graphics processing unit (GPU), a hardware processor core, or any combination thereof), a main memory 26004 and a static memory 26006, some or all of which may communicate with each other via an interlink (e.g., bus). The machine 26000 may further include a display unit 26010, an alphanumeric input device 26012 (e.g., a keyboard), and a user interface (UI) navigation device 26014 (e.g., a mouse). In an example described herein, the display unit 26010, input device 26012 and UI navigation device 26014 may be a touch screen display. The machine 26000 may additionally include a storage device (e.g., drive unit) 26016, a signal generation device 26018 (e.g., a speaker), a network interface device 26020, and one or more sensors 26021, such as a global positioning system (GPS) sensor, compass, accelerometer, or other sensor. The machine 26000 may include an output controller 26028, such as a serial (e.g., universal serial bus (USB)), parallel, or other wired or wireless (e.g., infrared (IR), near field communication (NFC), etc.) controller connection to communicate or control one or more peripheral devices (e.g., a printer, card reader, etc.).

The storage device 26016 may include a machine readable medium 26022 on which is stored one or more sets of data structures or instructions 26024 (e.g., software) embodying or utilized by any one or more of the techniques or functions described herein. The instructions 26024 may also reside, completely or at least partially, within the main memory 26004, within static memory 26006, or within the hardware processor 26002 during execution thereof by the machine 26000. In an example, one or any combination of the hardware processor 26002, the main memory 26004, the static memory 26006, or the storage device 26016 may constitute machine readable media.

While the machine readable medium 26022 is illustrated as a single medium, the term "machine readable medium" may include a single medium or multiple media (e.g., a centralized or distributed database, and/or associated caches and servers) configured to store the one or more instructions 26024.

The term "machine readable medium" may include any medium that is capable of storing, encoding, or carrying instructions for execution by the machine 26000 and that cause the machine 26000 to perform any one or more of the techniques of the present disclosure, or that is capable of storing, encoding or carrying data structures used by or associated with such instructions. Non-limiting machine readable medium examples may include solid-state memories and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that are not transitory propagating signals.

The instructions 26024 may further be transmitted or received over a communications network 26026 using a transmission medium via the network interface device 26020. The machine 26000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 26020 may include one or more physical jacks (e.g., Ethernet, coaxial, or phone jacks) or one or more antennas to connect to the communications network 26026. In an example, the network interface device 26020 may include a plurality of antennas to wirelessly communicate using at least one of single-input multiple-output (SIMO), multiple-input multiple-output (MIMO), or multiple-input single-output (MISO) techniques. In some examples, the network interface device 26020 may wirelessly communicate using Multiple User MIMO techniques.

Functions, operations, components and/or features described herein with reference to one or more embodiments, may be combined with, or may be utilized in combination with, one or more other functions, operations, components and/or features described herein with reference to one or more other embodiments, or vice versa.

For the purposes of promoting an understanding of the principles of this disclosure, reference has been made to the various configurations illustrated in the drawings, and specific language has been used to describe these configurations. However, no limitation of the scope of the inventive subject matter is intended by this specific language, and the inventive subject matter should be construed to encompass all embodiments and configurations that would normally occur to one of ordinary skill in the art. The configurations herein may be described in terms of functional block components and various processing steps. Such functional blocks may be realized by any number of components that perform the specified functions. The particular implementations shown and described herein are illustrative examples and are not intended to otherwise limit the scope of the inventive subject matter in any way. The connecting lines, or connectors shown in the various figures presented may, in some instances, be intended to represent example functional relationships and/or physical or logical couplings between the various elements. However, many alternative or additional functional relationships, physical connections or logical connections may be present in a practical device. Moreover, no item or component is essential unless the element is specifically described as "essential" or "critical". Numerous modifications and adaptations will be readily apparent to those skilled in this art.

Examples

Example 1 is an electronic neuromorphic core processor circuit comprising: a dendrite circuit comprising: an input circuit configured to receive an input spike message having an associated fan-in-population index (fip index) and a source atom number; a synapse map circuit configured to provide a mapping of the received fip index to a synapse base address in the memory, a routing list size, and a dendrite compartment base index; a synapse configuration circuit, comprising a plurality of type-space routing list connectivity structures stored in the memory representing sets of synaptic connections related to dendrite compartments for different population types; a dendrite accumulator circuit and memory comprising an array indexed by the associated dendrite compartment index and the synaptic connectivity properties; and a dendrite output at which a weighted sum value representing a total accumulated amount for the dendritic compartment at an output time is sent.

In Example 2, the subject matter of Example 1 optionally includes the feature(s) that: the fip index represents a specific fanin arc to a particular destination population instance in the core and the source atom identifies a particular neuron within the source population type in the core that initiated the spike message; the synapse map circuit is further configured to compute a routing list base address obtained by adding the synapse base address to a product of the routing list size and the source atom number for the synapse configuration; each set of synaptic connections comprises one or more bits of weight and other connectivity properties per dendrite compartment, wherein the synapse configuration circuit is configured to associate the connectivity properties of each connection in the set with a specific dendrite compartment index calculated as a sum of the dendrite compartment base index and an offset corresponding to each synapse connection in the set; and the dendrite accumulator circuit is configured to accumulate weight values within a dendritic compartment identified by the address.

In Example 3, the subject matter of Example 2 optionally includes the feature(s) that the input circuit is configured to process a series of input spike messages arriving in a time-multiplexed fashion.

In Example 4, the subject matter of any one or more of Examples 2-3 optionally include the feature(s) that weight values within a plurality of dendritic compartments are accumulated based on the set of synaptic connections associated with the fip idx and the atom number.

In Example 5, the subject matter of Example 4 optionally includes the feature(s) that each dendrite accumulator memory address associated with each dendritic compartment of the plurality of dendritic compartments is calculated as the sum of the dendritic compartment index, a service time T, and a delay time that is derived from the synaptic connectivity properties.

In Example 6, the subject matter of Example 5 optionally includes the feature(s) that the addresses associated with a dendrite compartment index over all delay time offsets are organized as a circular FIFO buffer.

In Example 7, the subject matter of any one or more of Examples 2-6 optionally include the feature(s) that, at a service time T, a subset of a plurality of dendritic compartments of the dendrite accumulator that are associated with the service time T are processed and a plurality of weighted sum values are sent from the dendrite output.

In Example 8, the subject matter of Example 7 optionally includes the feature(s) that after the plurality of weighted sum values are sent, the servicing time T is indexed to a next servicing time T+1 such that T+1→T.

In Example 9, the subject matter of Example 8 optionally includes after receiving a handshake from neighboring cores that is a barrier synchronization message indication completion of neuron servicing by the neighboring cores.

In Example 10, the subject matter of any one or more of Examples 2-9 optionally include the feature(s) that a first set of dendrite compartments associated with a first input fip index differs in size from a second set of dendrite compartments associated with a second input fip index belonging to a different population type.

In Example 11, the subject matter of any one or more of Examples 2-10 optionally include the feature(s) that the set of synaptic connections are shareable among a plurality of dendrite compartments.

In Example 12, the subject matter of any one or more of Examples 2-11 optionally include a soma circuit, comprising: a soma input connected to the dendrite output and at which the dendrite compartment weighted sum value is received comprising an index to a related soma compartment; a soma configuration memory of a soma compartment associated with the dendrite compartment, the soma configuration memory to store configuration parameters for a neuron comprising the soma compartment and that is configured to be updated by the processor based on the received weighted sum value; a soma state memory to store the neuron's present activation state level and that is configured to be updated by the processor based on the received weighted sum value, wherein if an updated present activation state level exceeds a threshold activation level value, the processor is configured to generate an output spike event comprising a spiking neuron index; an axon map memory comprising a mapping of the spiking neuron index to a spike fanout destination list identifier based on the fip index and the atom number; an axon configuration memory comprising a list of one or more destination core-fip index pairs referenced by the spike fanout destination list identifier; and an output circuit configured to route a spike message containing the source atom number and the fip index to each destination core of the list.

Example 13 is an electronic neuromorphic core processor circuit comprising: a soma circuit, comprising: a soma input at which a dendrite compartment weighted sum value is received comprising an index to a related soma compartment; a soma configuration memory of a soma compartment associated with the dendrite compartment, the soma configuration memory to store configuration parameters for a neuron comprising the soma compartment and that is configured to be updated by the processor based on the received weighted sum value; a soma state memory to store the neuron's present activation state level and that is configured to be updated by the processor based on the received weighted sum value, wherein if an updated present activation state level exceeds a threshold activation level value, the processor is configured to generate an output spike event comprising a spiking neuron index; an axon map memory to store a mapping of the spiking neuron index to a spike fanout destination list identifier based on the fip index and the atom number; an axon configuration memory to store a list of one or more destination core-fip index pairs referenced by the spike fanout destination list identifier; and an output circuit configured to route a spike message comprising the fip index and source atom number to each destination core of the list.

In Example 14, the subject matter of Example 13 optionally includes the feature(s) that the output spike event is delayed before being passed to the axon map by a delay amount specified in the soma configuration memory.

In Example 15, the subject matter of any one or more of Examples 13-14 optionally include the feature(s) that the processor is configured to reset the present active state level if an output spike event is generated.

In Example 16, the subject matter of any one or more of Examples 13-15 optionally include the feature(s) that the axon configuration memory is sharable by a plurality of neurons.

In Example 17, the subject matter of any one or more of Examples 13-16 optionally include the feature(s) that the soma input is configured to receive a plurality of weighted sum values arriving in a time-multiplexed fashion.

In Example 18, the subject matter of any one or more of Examples 13-17 optionally include the feature(s) that the output circuit is configured to route a plurality of output spike messages serially.

Example 20 is a system for performing neuromorphic computing, comprising: an electronic neuromorphic core processor circuit comprising: a dendrite circuit comprising: an input circuit configured to receive an input spike message having an associated fan-in-population index (fip index) and a source atom number; a synapse map circuit configured to provide a mapping of the received fip index to a synapse base address in the memory, a routing list size, and a dendrite compartment base index; a synapse configuration circuit, comprising a plurality of type-space routing list connectivity structures stored in the memory representing sets of synaptic connections related to dendrite compartments for different population types; a dendrite accumulator circuit and memory comprising an array indexed by the associated dendrite compartment index and the synaptic connectivity properties; and a dendrite output at which a weighted sum value representing a total accumulated amount for the dendritic compartment at an output time is sent.

In Example 21, the subject matter of Example 20 optionally includes the feature(s) that the input circuit is configured to process a series of input spike messages arriving in a time-multiplexed fashion.

Example 22 is a method of operating an electronic neuromorphic core processor, comprising: by a dendrite circuit: receiving an input spike message having an associated fan-in-population index (fip index) and a source atom number, the fip index representing a specific fanin arc to a particular destination population instance in the core and the source atom identifying the particular neuron within the source population type in the core that initiated the spike message; synapse mapping the fip index to a synapse configuration in a memory comprising a synapse base address, a routing list size, and a dendrite compartment base index; associating the fip index, the atom number, the synapse base address, and the routing list size with a routing list in the memory that is a set of synaptic connections related to a set of dendrite compartments in population type space, each comprising one or more bits of weight and other connectivity properties per dendrite compartment; associating each weight and other properties with a specific dendrite index calculated as the dendrite compartment base address plus an offset incrementing over each synapse connection in the associated set of connections from the memory; accumulating, in a dendrite accumulator comprising an array indexed by the dendrite index, weight values within a dendritic compartment; and sending, from a dendrite output, a weighted sum value representing a total accumulated amount for the dendritic compartment at an output time; and by a soma circuit: receiving, at a soma input connected to the dendrite output the weighted sum value comprising an index to a related soma compartment; updating, with the processor and based on the received weighted sum value: a soma state memory to store the neuron's present activation state level, wherein if an updated present activation state level exceeds a threshold activation level value, then generating an output spike event comprising a spiking neuron index; the method further comprising: routing a spike message to each destination core of a list that is one or more destination core—fip index pairs referenced by a spike fanout destination list identifier that was mapped by an axon map memory from the spiking neuron index, wherein each spike message comprises the fip index and the source atom number.

In Example 23, the subject matter of Example 22 optionally includes associating each weight with a specific dendrite index calculated as the sum of a multiple of the dendrite compartment base address plus an offset incrementing over each synapse connection, and the current service time T plus a delay time derived from the synaptic connectivity properties, modulo a maximum delay time value.

In Example 24, the subject matter of Example 23 optionally includes, at a service time T, processing a plurality of dendritic compartments of the dendrite accumulator and sending a plurality of weighted sum values from the dendrite output that are associated with the service time T.

In Example 25, the subject matter of any one or more of Examples 22-24 optionally include, after the plurality of weighted sum values are sent, indexing the servicing time T to a next servicing time T+1 after receiving a handshake from neighboring cores that is a barrier synchronization message indicating completion of neuron servicing by the neighboring cores.

In Example 26, the subject matter of any one or more of Examples 22-25 optionally include the feature(s) that a first set of dendrite compartments associated with a first input fip index differs in size from a second set of dendrite compartments associated with a second input fip index belonging to a different population type.

Example 27 is at least one machine readable medium that, when executed by a machine, causes the machine to perform any of the methods of Examples 22-26.

Example 28 is an electronic neuromorphic core processor circuit, comprising: by a dendrite circuit: means for receiving an input spike message having an associated fan-in-population index (fip index) and a source atom number, the fip index representing a specific fanin arc to a particular destination population instance in the core and the source atom identifying the particular neuron within the source population type in the core that initiated the spike message; means for synapse mapping the fip index to a synapse configuration in a memory comprising a synapse base address, a routing list size, and a dendrite compartment base index; means for associating the fip index, the atom number, the synapse base address, and the routing list size with a routing list in the memory that is a set of synaptic connections related to a set of dendrite compartments in population type space, each comprising one or more bits of weight and other connectivity properties per dendrite compartment; means for associating each weight and other properties with a specific dendrite index calculated as the dendrite compartment base address plus an offset incrementing over each synapse connection in the associated set of connections from the memory; means for accumulating, in a dendrite accumulator comprising an array indexed by the dendrite index, weight values within a dendritic compartment; and means for sending, from a dendrite output, a weighted sum value representing a total accumulated amount for the dendritic compartment at an output time.

In Example 29, the subject matter of Example 28 optionally includes, in a soma circuit: means for receiving, at a soma input connected to the dendrite output the weighted sum value comprising an index to a related soma compartment; means for updating, with the processor and based on the received weighted sum value: a soma state memory to store the neuron's present activation state level, wherein if an updated present activation state level exceeds a threshold activation level value, then generating an output spike event comprising a spiking neuron index; the circuit further comprising: means for routing a spike message to each destination core of a list that is one or more destination core—tip index pairs referenced by a spike fanout destination list identifier that was mapped by an axon map memory from the spiking neuron index, wherein each spike message comprises the fip index and the source atom number.

In Example 30, the subject matter of Example 29 optionally includes means for associating each weight with a specific dendrite index calculated as the sum of a multiple of the dendrite compartment base address plus an offset incrementing over each synapse connection, and the current service time T plus a delay time derived from the synaptic connectivity properties, modulo a maximum delay time value.

In Example 31, the subject matter of Example 30 optionally includes means for, at a service time T, processing a plurality of dendritic compartments of the dendrite accumulator and sending a plurality of weighted sum values from the dendrite output that are associated with the service time T.

In Example 32, the subject matter of any one or more of Examples 29-31 optionally, include, after the plurality of weighted sum values are sent, indexing the servicing time T to a next servicing time T+1 after receiving a handshake from neighboring cores that is a barrier synchronization message indicating completion of neuron servicing by the neighboring cores.

In Example 33, the subject matter of any one or more of Examples 29-32 optionally include the feature(s) that a first set of dendrite compartments associated with a first input fip index differs in size from a second set of dendrite compartments associated with a second input fip index belonging to a different population type.

Example 34 is at least one machine readable medium including instructions that, when executed by an electronic neuromorphic core processor, cause the electronic neuromorphic core processor to perform operations comprising: by a dendrite circuit: receiving an input spike message having an associated fan-in-population index (fip index) and a source atom number, the fip index representing a specific fanin arc to a particular destination population instance in the core and the source atom identifying the particular neuron within the source population type in the core that initiated the spike message; synapse mapping the fip index to a synapse configuration in a memory comprising a synapse base address, a routing list size, and a dendrite compartment base index; associating the fip index, the atom number, the synapse base address, and the routing list size with a routing list in the memory that is a set of synaptic connections related to a set of dendrite compartments in population type space, each comprising one or more bits of weight and other connectivity properties per dendrite compartment; associating each weight and other properties with a specific dendrite index calculated as the dendrite compartment base address plus an offset incrementing over each synapse connection in the associated set of connections from the memory; accumulating, in a dendrite accumulator comprising an array indexed by the dendrite index, weight values within a dendritic compartment; and sending, from a dendrite output, a weighted sum value representing a total accumulated amount for the dendritic compartment at an output time.

In Example 35, the subject matter of Example 34 optionally includes the operations that further comprise: by a soma circuit: receiving, at a soma input connected to the dendrite output the weighted sum value comprising an index to a related soma compartment; updating, with the processor and based on the received weighted sum value: a soma state memory to store the neuron's present activation state level, wherein if an updated present activation state level exceeds a threshold activation level value, an output spike event is generated that comprises a spiking neuron index; the method further comprising: routing a spike message to each destination core of list that is one or more destination core—fip index pairs referenced by a spike fanout destination list identifier that was mapped by an axon map memory from the spiking neuron index, wherein each spike message comprises the fip index and the source atom number.

The invention claimed is:

1. An electronic neuromorphic core processor circuit comprising:
　a dendrite circuit comprising:
　　an input circuit configured to receive an input spike message having an associated axon identifier (AxonID) and a source atom number;
　　a synapse map circuit configured to provide a mapping of the received AxonID to a synapse base address in a synapse map memory, a routing list size, and a dendrite compartment base index;
　　a synapse configuration circuit, comprising a plurality of routing list connectivity structures stored in synapse configuration memory representing sets of synaptic connections related to dendrite compartments for different population types;
　　a dendrite accumulator circuit, comprising a dendrite accumulator memory comprising an array indexed by the associated dendrite compartment base index, the source atom number, and synaptic connectivity properties; and
　　a dendrite output at which a dendrite compartment weighted sum value representing a total accumulated amount for the dendrite compartment at an output time is sent, wherein:
　　　the AxonID is associated with a routing list, by the synapse configuration circuit, to a particular destination population instance in a first core and the source atom number identifies a particular neuron within a source population type in a second core that initiated the spike message;
　　　the synapse map circuit is further configured to compute a routing list base address by adding the synapse base address to a product of the routing list size and the source atom number for a synapse configuration;
　　　each set of synaptic connections comprises one or more bits of weight and other connectivity properties per dendrite compartment of a plurality of dendrite compartments, wherein the synapse configuration circuit is configured to associate the synaptic connectivity properties of each synaptic connection in the set with a specific dendrite compartment index calculated as a sum of the dendrite compartment base index and an offset corresponding to each synaptic connection in the set, each of a plurality of dendrite accumulator memory array indices being an address associated with each dendrite compartment of the plurality of dendrite compartments calculated as the sum of the dendrite compartment index, a service time T, and a delay time that is derived from the synaptic connectivity properties, and
　　　the dendrite accumulator circuit is configured to accumulate weight values within a dendritic compartment identified by the specific dendrite compartment index, the weight values within a plurality of the dendrite compartments accumulated based on the set of synaptic connections associated with the AxonID and the source atom number.

2. The circuit of claim 1, wherein the input circuit is configured to process a series of input spike messages arriving in a time-multiplexed fashion.

3. The circuit of claim 1, wherein the addresses associated with a dendrite compartment index over all delay time offsets are organized as a circular first-in-first-out (FIFO) buffer.

4. The circuit of claim 1, wherein, at a service time T, a subset of a plurality of dendrite compartments of the dendrite accumulator that are associated with the service time T are processed and a plurality of weighted sum values are sent from the dendrite output.

5. The circuit of claim 4, wherein after the plurality of weighted sum values are sent, the service time T is indexed to a next service time T+1.

6. The circuit of claim 5, wherein the service time T is indexed to the next service time T+1 after receiving a handshake from neighboring cores that is a barrier synchronization message indicating completion of neuron servicing by the neighboring cores.

7. The circuit of claim 1, wherein a first set of dendrite compartments associated with a first input AxonID differs in size from a second set of dendrite compartments associated with a second input AxonID belonging to a different population type.

8. The circuit of claim 1, further comprising:
a soma circuit, comprising:
a soma input connected to the dendrite output and at which the dendrite compartment weighted sum value is received comprising an index to a corresponding soma compartment;
a soma configuration memory of a soma compartment associated with the dendrite compartment, the soma configuration memory storing configuration parameters for the neuron comprising the soma compartment and configured to be updated by the processor circuit based on the received weighted sum value;
a soma state memory storing a present activation state level of the neuron and configured to be updated by the processor circuit based on the received weighted sum value, wherein responsive to an updated present activation state level exceeding a threshold activation level value, the processor circuit is configured to generate an output spike event comprising a spiking neuron index;
an axon map memory comprising a mapping of the spiking neuron index to a spike fanout destination list identifier based on the AxonID and the source atom number;
an axon configuration memory comprising a list of one or more destination core-AxonID pairs referenced by the spike fanout destination list identifier; and
an output circuit configured to route a spike message containing the source atom number and the AxonID to each destination core of the list of destination core-AxonID pairs.

9. A system for performing neuromorphic computing, comprising:
an electronic neuromorphic core processor circuit comprising:
a dendrite circuit comprising:
an input circuit configured to receive an input spike message having an associated axon identifier (AxonID) and a source atom number;
a synapse map circuit configured to provide a mapping of the received AxonID to a synapse base address in a synapse map memory, a routing list size, and a dendrite compartment base index;
a synapse configuration circuit, comprising a plurality of routing list connectivity structures stored in a synapse configuration memory, the connectivity structures representing sets of synaptic connections related to dendrite compartments for different population types;
a dendrite accumulator circuit, comprising a dendrite accumulator memory comprising an array indexed by the associated dendrite compartment base index, the source atom number, and synaptic connectivity properties; and
a dendrite output at which a weighted sum value representing a total accumulated amount for the dendritic compartment at an output time is sent, wherein:
the AxonID is associated with a routing list, by the synapse configuration circuit, to a particular destination population instance in a first core and the source atom number identifies a particular neuron within a source population type in a second core that initiated the spike message;
the synapse map circuit is further configured to compute a routing list base address by adding the synapse base address to a product of the routing list size and the source atom number for a synapse configuration;
each set of synaptic connections comprises one or more bits of weight and other connectivity properties per dendrite compartment of a plurality of dendrite compartments, wherein the synapse configuration circuit is configured to associate the connectivity properties of each connection in each set with a specific dendrite compartment index calculated as a sum of the dendrite compartment base index and an offset corresponding to each synaptic connection in each set, and each dendrite accumulator memory array index is an address associated with each dendrite compartment of the plurality of dendrite compartments calculated as the sum of the dendrite compartment index, a service time T, and a delay time that is derived from the synaptic connectivity properties; and
the dendrite accumulator circuit is configured to accumulate weight values within a dendrite compartment identified by the specific dendrite compartment index, the weight values within a plurality of dendrite compartments accumulated based on the set of synaptic connections associated with the AxonID and the source atom number.

10. The system of claim 9, wherein the input circuit is configured to process a series of input spike messages arriving in a time-multiplexed fashion.

11. A method of operating an electronic neuromorphic core processor, comprising:

by a dendrite circuit:
receiving an input spike message having an associated axon identifier (AxonID) and a source atom number, the Axon ID associated with a routing list to a particular destination population instance in a first core and the source atom number identifying a particular neuron within a source population type in a second core that initiated the spike message;

synapse mapping the AxonID to a synapse configuration in a memory comprising a synapse base address, a routing list size, and a dendrite compartment base index;

associating the AxonID, the source atom number, the synapse base address, and the routing list size with a routing list in the memory that is a set of synaptic connections related to a set of dendrite compartments, each synaptic connection comprising one or more bits of weight and other connectivity properties per dendrite compartment of the set of dendrite compartments;

associating each weight and other properties with a specific dendrite index calculated as a dendrite compartment base address plus an offset incrementing over each synapse connection in the associated set of synaptic connections from the memory;

accumulating, in a dendrite accumulator comprising an array indexed by the dendrite index, weight values within each dendrite compartment; and sending, from a dendrite output, a weighted sum value representing a total accumulated amount for each dendrite compartment of the set of dendrite compartments at an output time, wherein:
the AxonID is associated with a routing list to a particular destination population instance in the first core and the source atom number identifies a particular neuron within a source population type in the second core;
a routing list base address is obtained by adding the synapse base address to a product of the routing list size and the source atom number for a synapse configuration;
each set of synaptic connections comprises one or more bits of weight and other connectivity properties per dendrite compartment, wherein the connectivity properties of each connection in the set of synaptic connections is associated with a specific dendrite compartment index calculated as a sum of the dendrite compartment base index and an offset corresponding to each synaptic connection in the set of synaptic connections, each dendrite accumulator memory array index being an address associated with each dendrite compartment of the plurality of dendrite compartments calculated as the sum of the dendrite compartment index, a service time T, and a delay time that is derived from the synaptic connectivity properties; and
weight values are accumulated within each of the dendrite compartments each dendrite compartment identified by the specific dendrite compartment index, the weight values within the plurality of dendrite compartments accumulated based on the set of synaptic connections associated with the AxonID and the source atom number; and by a soma circuit:
receiving, at a soma input connected to the dendrite output, the weighted sum value comprising an index to a corresponding soma compartment;
updating, with the processor and based on the received weighted sum value:
a soma state memory to store a present activation state level of the neuron, wherein if an updated present activation state level exceeds a threshold activation level value, then an output spike event comprising a spiking neuron index is generated;
the method further comprising:
routing a spike message to each destination core of a list that is one or more destination core-AxonID pairs, wherein the destination core-AxonID pairs are referenced by the spike fanout destination list identifier, wherein the spike fanout destination list identifier is mapped by an axon map memory from the spiking neuron index, and wherein each spike message comprises the AxonID and the source atom number.

12. The method of claim 11, further comprising, at a service time T, processing a plurality of dendrite compartments of the dendrite accumulator and sending a plurality of weighted sum values from the dendrite output that are associated with the service time T.

13. The method of claim 11, further comprising, after the plurality of weighted sum values are sent, indexing the service time T to a next service time T+1 after receiving a handshake from neighboring cores that is a barrier synchronization message indicating completion of neuron servicing by the neighboring cores.

14. At least one non-transitory machine readable medium including instructions that, when executed by an electronic neuromorphic core processor, cause the electronic neuromorphic core processor to perform operations comprising:

by a dendrite circuit:
receiving an input spike message having an associated axon identifier (AxonID) and a source atom number, the AxonID associated with a routing list to a particular destination population instance in a first core and the source atom number identifying a particular neuron within a source population type in a second core that initiated the spike message;

synapse mapping the AxonID to a synapse configuration in a memory comprising a synapse base address, a routing list size, and a dendrite compartment base index;

associating the AxonID, the source atom number, the synapse base address, and the routing list size with a routing list in the memory, the routing list comprising a set of synaptic connections related to a set of dendrite compartments, each synaptic connection of the set of synaptic connections comprising one or more bits of weight and other connectivity properties per dendrite compartment in the set of dendrite compartments;

associating each weight and other properties with a specific dendrite index calculated as a dendrite compartment base address plus an offset incrementing over each synapse connection in the associated set of synaptic connections from the memory;

accumulating, in a dendrite accumulator comprising an array indexed by the dendrite index, weight values within each dendrite compartment of the set of dendrite compartments; and sending, from a dendrite output, a weighted sum value representing a total accumulated amount for each dendrite compartment of the set of dendrite compartments at an output time, wherein:
the AxonID is associated with a routing list to a particular destination population instance in the first core and the source atom number identifies a particular neuron within a source population type in the second core;
a routing list base address is obtained by adding the synapse base address to a product of the routing list size and the source atom number for a synapse configuration;
each set of synaptic connections comprises one or more bits of weight and other connectivity properties per dendrite compartment of the set of dendrite compartments, wherein the connectivity properties of each connection in the set of synaptic connections is associated with a specific dendrite compartment index calculated as a sum of the dendrite compartment base index and an offset corresponding to each synapse connection in the set of synaptic connections, each dendrite accumulator memory array index being an address associated with each dendrite compartment of the plurality of dendrite compartments calculated as the sum of the dendrite compartment index, a service time T, and a delay time that is derived from the synaptic connectivity properties; and
weight values are accumulated within the dendrite compartment identified by the specific dendrite compartment index, and the weight values within the plurality of dendrite compartments are accumulated based on the set of synaptic connections associated with the AxonID and the source atom number.

15. The at least one non-transitory machine readable medium of claim 14, the operations further comprising:
by a soma circuit:
receiving, at a soma input connected to the dendrite output the weighted sum value comprising an index to a corresponding soma compartment;
updating, with the processor and based on the received weighted sum value:
a soma state memory to store a present activation state level of the neuron, wherein if an updated present activation state level exceeds a threshold activation level value, then an output spike event comprising a spiking neuron index is generated;
the operations further comprising:
routing a spike message to each destination core of a list that is one or more destination core-AxonID pairs, wherein the destination core-AxonID pairs are referenced by a spike fanout destination list identifier, wherein the spike fanout destination list identifier is mapped by an axon map memory from the spiking neuron index, and wherein each spike message comprises the AxonID and the source atom number.

16. The at least one non-transitory machine readable medium of claim 14, wherein, at a service time T, a subset of a plurality of dendrite compartments of the dendrite accumulator that are associated with the service time T are processed and a plurality of weighted sum values are sent from the dendrite output.

17. The at least one non-transitory machine readable medium of claim 16, wherein after the plurality of weighted sum values are sent, the service time T is indexed to a next service time T+1.

18. The at least one non-transitory machine readable medium of claim 17, wherein the service time T is indexed to the next service time T+1 after receiving a handshake from neighboring cores that is a barrier synchronization message indicating completion of neuron servicing by the neighboring cores.

19. The at least one non-transitory machine readable medium of claim 14, wherein a first set of dendrite compartments associated with a first input AxonID differs in size from a second set of dendrite compartments associated with a second input AxonID belonging to a different population type.

20. The at least one non-transitory machine readable medium of claim 14, wherein the input spike message is one of a series of input spike messages arriving in a time-multiplexed fashion.

21. The at least one non-transitory machine readable medium of claim 14, wherein the addresses associated with the dendrite compartment index over all delay time offsets are organized as a circular first-in-first-out (FIFO) buffer.

* * * * *

UNITED STATES PATENT AND TRADEMARK OFFICE
CERTIFICATE OF CORRECTION

PATENT NO. : 10,867,238 B2  
APPLICATION NO. : 15/385057  
DATED : December 15, 2020  
INVENTOR(S) : Michael I. Davies Page 1 of 1

It is certified that error appears in the above-identified patent and that said Letters Patent is hereby corrected as shown below:

In the Claims

In Column 35, Line 62, in Claim 11, after "compartments", insert --,--

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*